US009928006B2

(12) United States Patent
Kim et al.

(10) Patent No.: US 9,928,006 B2
(45) Date of Patent: Mar. 27, 2018

(54) MEMORY DEVICE AND A MEMORY SYSTEM INCLUDING THE SAME

(71) Applicant: SAMSUNG ELECTRONICS CO., LTD., Suwon-si, Gyeonggi-do (KR)

(72) Inventors: Chul-Bum Kim, Seoul (KR); Dong-Ku Kang, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/262,478

(22) Filed: Sep. 12, 2016

(65) Prior Publication Data

US 2017/0075626 A1   Mar. 16, 2017

(30) Foreign Application Priority Data

Sep. 16, 2015   (KR) .................. 10-2015-0131054

(51) Int. Cl.
*G06F 3/06*   (2006.01)

(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/0655; G06F 3/061; G06F 3/0679
USPC .................... 711/154, 5, 105, 156
See application file for complete search history.

(56) References Cited

U.S. PATENT DOCUMENTS

| | | | | |
|---|---|---|---|---|
| 5,657,455 A | * | 8/1997 | Gates | G06F 13/124 710/100 |
| 5,978,863 A | * | 11/1999 | Gates | G06F 13/126 710/100 |
| 6,567,904 B1 | * | 5/2003 | Khandekar | G11C 7/1021 365/230.03 |
| 7,573,774 B2 | | 8/2009 | Kwon et al. | |
| 7,715,255 B2 | | 5/2010 | Tu et al. | |
| 8,149,622 B2 | | 4/2012 | Lee et al. | |
| 8,730,705 B1 | * | 5/2014 | Stephens, Jr. | G11C 11/40615 257/690 |
| 8,972,686 B2 | | 3/2015 | Takemae | |
| 9,036,431 B2 | | 5/2015 | Kim et al. | |
| 9,043,578 B2 | | 5/2015 | Chen et al. | |
| 2001/0021960 A1 | * | 9/2001 | Manning | G11C 7/1078 711/105 |
| 2011/0126066 A1 | | 5/2011 | Jo et al. | |
| 2013/0094271 A1 | | 4/2013 | Schuetz | |
| 2015/0127914 A1 | | 5/2015 | Song et al. | |
| 2016/0004438 A1 | * | 1/2016 | Moon | G06F 3/061 711/103 |

FOREIGN PATENT DOCUMENTS

| KR | 1020110058028 | 6/2011 |
|---|---|---|
| KR | 1020150050879 | 5/2015 |

* cited by examiner

*Primary Examiner* — Stephen Elmore
(74) *Attorney, Agent, or Firm* — F. Chau & Associates, LLC

(57) ABSTRACT

A memory device may include an input/output control unit for receiving input signals through an input/output bus, and a control logic unit for receiving control signals, and when the control signals satisfy first through fourth conditions, the control logic unit identifies a command, an address, data and an identifier of the memory device in the input signals, and latches the input signals. The fourth condition is different from the first through third conditions.

20 Claims, 18 Drawing Sheets

FIG. 5

| Condition | CE# | CLE | ALE | WE# | RE# | Description |
|---|---|---|---|---|---|---|
| – | H | X | X | X | X | Standby |
| #1 | L | H | L | ⎍ | H | Latch Command |
| #2 | L | L | H | ⎍ | H | Latch Address |
| #3 | L | L | L | ⎍ | H | Latch Data |

H: High level, L: Low Level, X: Don't care, ⎍ : Rising edge

MEMORY DEVICE AND A MEMORY SYSTEM INCLUDING THE SAME

CROSS-REFERENCE TO RELATED APPLICATION

This application claims priority under 35 U.S.C. § 119 to Korean Patent Application No. 10-2015-0131054, filed on Sep. 16, 2015, in the Korean Intellectual Property Office, the disclosure of which is incorporated by reference herein in its entirety.

TECHNICAL FIELD

The inventive concept relates to a memory device, and more particularly, to a memory device and a memory system including a plurality of memory devices.

DISCUSSION OF RELATED ART

Memory devices are used to store data, and may be classified as volatile memory devices and nonvolatile memory devices. Nonvolatile memory devices can retain their data in the absence of power, while volatile memory devices cannot. A flash memory device, as an example of a nonvolatile memory device, may be used in mobile phones, digital cameras, personal digital assistants (PDAs), mobile computer devices, fixed computer devices and other devices.

SUMMARY

According to an exemplary embodiment of the inventive concept, a memory device may include an input/output control unit for receiving input signals through an input/output bus; and a control logic unit for receiving control signals, and when the control signals satisfy first through fourth conditions, the control logic unit identifies a command, an address, data and a device identifier in the input signals, and latches the input signals, wherein the fourth condition may be different from the first through third conditions.

The memory device may further include a command register, an address register, a data register and an identifier register, wherein the control logic unit controls the latching of the input signals to the command register, the address register, the data register and the identifier register.

The memory device may further include: an identifier storage; and an identifier comparator for comparing the latched memory device identifier with an identifier stored in the identifier storage, wherein the control logic unit puts the memory device in a standby mode or releases the memory device from the standby mode in response to an output signal of the identifier comparator.

When the memory device is in the standby mode, the memory device may not latch the input signals when the control signals satisfy the first through third conditions.

The memory device may suspend a first mode at the time of entering the standby mode and resume the first mode at the time of exiting the standby mode.

The control logic unit may store values corresponding to the input signals in the identifier storage when the control signals satisfy a fifth condition different from the first through fourth conditions.

The control signals may include a chip enable, an address latch enable, a command latch enable and a write enable, and the fourth condition is a condition in which the write enable changes from an active state to an inactive state when the chip enable, the address latch enable and the command latch enable are each in an active state.

The control signals may include a chip enable, an address latch enable, a read enable and a write enable, and the fourth condition is a condition in which the write enable changes from an active state to an inactive state when the chip enable is in an active state and the address latch enable and the read enable are each in an inactive state.

The control signals may include a chip enable, an identifier enable and a write enable, and the fourth condition is a condition in which the write enable changes from an active state to an inactive state when the chip enable and the identifier enable are each in an active state.

The control logic unit may identify input signals latched at a second time as identifiers of the memory device, when the control signals satisfy the fourth condition two or more consecutive times and input signals latched at a first time are equal to predetermined values.

According to an exemplary embodiment of the inventive concept, a memory system may include a first and second memory devices sharing an input/output bus, wherein the first and second memory devices receive identical control signals, the first memory device stores a first identifier, the second memory device stores a second identifier and the first and second identifiers are different from each other, wherein the first and second memory devices may receive input signals through the input/output bus and when the control signals satisfy first through fourth conditions, each of the first and second memory devices identifies a command, an address, data and a memory device identifier in the input signals and latches the input signals, and wherein the fourth condition may be different from the first through third conditions.

The first memory device may be put in a standby mode or released from the standby mode in response to a comparison of the first identifier and an identifier of the first memory device, and the first memory device may be put in a standby mode or released from the standby mode in response to a comparison of the second identifier and the identifier of the first memory device.

When the first memory device is in the standby mode, the first memory device may not latch the input signals when the control signals satisfy the first through third conditions, and when the second memory device is in the standby mode, the second memory device may not latch the input signals when the control signals satisfy the first through third conditions.

Each of the first and second memory devices may suspend a first mode at the time of entering the standby mode from the first mode, and resume the first mode at the time of exiting the standby mode.

The memory system may further include a memory controller which is connected to the input/output bus, wherein the memory controller generates the control signals and performs first and second operations respectively accessing the first and second memory devices, wherein the memory controller suspends the first operation, and starts to perform the second operation by transmitting the second identifier via the input/output bus and transmitting control signals satisfying the fourth condition, and resumes the first operation by transmitting the first identifier via the input/output bus after completion of the second operation and transmitting control signals satisfying the fourth condition.

According to an exemplary embodiment of the inventive concept, a memory system includes: a controller configured to output control signals and input signals; and a first memory device configured to receive the control signals and the input signals from the controller and latch a first device identifier at a condition different from conditions of control signals for latching a command, an address and data.

The control signals may be provided to the first memory device via signal lines and the input signals are provided to the first memory device via a data bus.

The memory system may further include a second memory device, wherein the first memory device and the second memory device share a channel.

When the first memory device receives a second device identifier, operations of the first memory device may be stopped, and when the first memory device again receives the first device identifier, the operations of the first memory device may pick up where they left off.

The first memory device may include vertical NAND flash memory cells.

BRIEF DESCRIPTION OF THE DRAWINGS

The above and other features of the inventive concept will become more clearly understood by describing in detail exemplary embodiments thereof with reference to the accompanying drawings in which:

FIG. 5 is a table illustrating conditions of control signals for latching commands, addresses and data according to an exemplary embodiment of the present inventive concept;

DETAILED DESCRIPTION OF THE EMBODIMENTS

Figure 1:
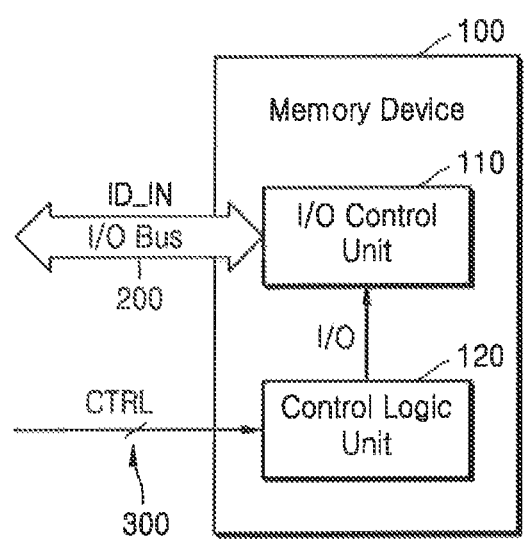
FIG. 1 is a block diagram of a memory device according to an exemplary embodiment of the present inventive concept.

Exemplary embodiments of the inventive concept will now be described more fully with reference to the accompanying drawings. The inventive concept may, however, be embodied in many different forms and should not be construed as being limited to the embodiments set forth herein. In the drawings, the thicknesses of layers and regions may be exaggerated for clarity. Like reference numerals in the drawings may denote like elements, and thus their repeated description may be omitted. All elements shown in the drawings, e.g., units, registers, etc., may be composed of circuits.

An expression used in the singular encompasses the expression of the plural, unless it has a clearly different meaning in the context.

FIG. 1 is a block diagram of a memory device according to an exemplary embodiment of the present inventive concept. Referring to FIG. 1, a memory device 100 may receive an identifier ID_IN through an input/output I/O bus 200, and control signals CTRL through signal lines 300. For example, the memory device 100 may be connected to a memory controller through the I/O bus 200 and signal lines 300, receive commands, addresses, data, identifiers, etc. from the memory controller through the I/O bus 200, and receive control signals CTRL through the signal lines 300. In addition, the memory device 100 may transmit data to the memory controller through the I/O bus 200. As illustrated in FIG. 1, the memory device 100 may include an I/O control unit 110 and a control logic unit 120.

According to an exemplary embodiment of the present inventive concept, the memory device 100 may have a unique identifier. The identifier of the memory device 100 may be used by a memory controller for accessing the memory device 100. For example, the memory controller may be connected to a plurality of memory devices sharing the I/O bus 200 as well as the signal lines 300. The plurality of memory devices may include the memory device 100. The memory controller may transmit identifiers of the memory device 100 to the I/O bus 200 for accessing the memory device 100 among the plurality of memory devices. When the identifier received through the I/O bus 200 is identical to that of the memory device 100, the memory device 100 may respond to subsequent control signals CTRL of the memory controller.

In a method to reduce the number of signal lines 300 between the memory controller and the plurality of memory devices, the memory controller may independently control each of the memory devices when the memory controller is connected to the memory devices through at least one of the signal lines 300 (for example, through a chip enable CE# line to be described below with reference to FIG. 2). However, when the number of memory devices is increased, the number of signal lines 300 increases, and accordingly, an interconnection between the memory controller and the memory devices may become complicated. For example, the complicated interconnections between the memory controller and the memory device may cause an increase in routing issues and signal delays. An exemplary embodiment of the present inventive concept provides a memory device and a memory system including a plurality of the memory devices in which each of the memory devices may be independently controlled and at the same time, while simplifying the interconnections between the memory controller and the memory devices.

Referring to FIG. 1, the I/O control unit 110 may receive input signals through the I/O bus 200 and control transmission of output signals. For example, the I/O control unit 110 may receive input signals transmitted through the I/O bus 200 from the outside, based on I/O control signals received from the control logic unit 120, and may transmit output signals generated in the memory device 100 (for example, data stored in the memory device 100) through the I/O bus 200. According to an exemplary embodiment of the present inventive concept, the I/O control unit 110 may receive an identifier ID_IN through the I/O bus 200 under a control of the control logic unit 120, and may provide the received identifier ID_IN for latching.

Referring to FIG. 1, the control logic unit 120 may receive control signals CTRL through the signal lines 300 from the outside of the memory device 100, and control other components of the memory device 100 based on the received control signals CTRL. In other words, the control logic unit 120 may determine whether the received control signals CTRL satisfy one of a plurality of predetermined conditions, and may control an operation of the memory device 100 corresponding to a related condition when one of the plurality of conditions is satisfied. For example, the control logic unit 120 may control the I/O control unit 110 by generating I/O control signals depending on the conditions satisfied by the control signals CTRL. In addition, depending on the conditions satisfied by the control signals CTRL, the control logic unit 120 may control latching of input signals received through the I/O bus 200 such as commands, addresses, data and identifiers, and may control operations of processing input signals.

According to an exemplary embodiment of the present inventive concept, the control logic unit 120 may control latching of the identifier ID_IN when the control signals CTRL satisfy conditions different from those used for latching other input signals. For example, when the control signals CTRL satisfy first through fourth conditions, the control logic unit 120 may respectively determine the control signals CTRL as the command, the address, the data and the identifier ID_IN, and control respective latching operations of the command, the address, the data and the identifier ID_IN. According to an exemplary embodiment of the present inventive concept, the fourth condition for latching of the identifier ID_IN may be different from the first through third conditions for latching other input signals. Accordingly, the identifier ID_IN may be independently latched with respect to the other input signals, and thus, the operation of the memory device 100 may not be affected by the latching of the identifier ID_IN.

Figure 2:
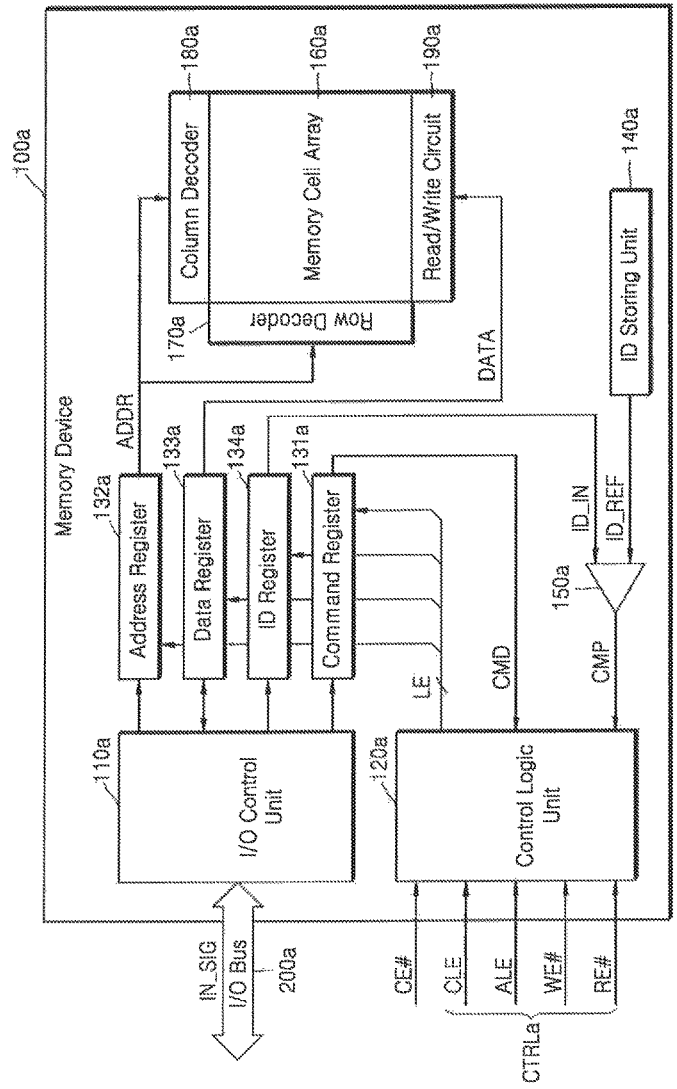
FIG. 2 is a block diagram of the memory device of FIG. 1 according to an exemplary embodiment of the present inventive concept.

FIG. 2 is a block diagram of an example 100a of the memory device 100 of FIG. 1 according to an exemplary embodiment of the present inventive concept. As described above with reference to FIG. 1, the memory device 100a may receive input signals IN_SIG through an I/O bus 200a and control signals CE#, CTRLa through a plurality of signal lines. Referring to FIG. 2, the memory device 100a may include an I/O control unit 110a, a control logic unit 120a, a command register 131a, an address register 132a, a data register 133a, an identifier register 134a, an identifier storage 140a, an identifier comparator 150a, a memory cell array 160a, a row decoder 170a, a column decoder 180a and a read/write circuit 190a. In addition, the memory device 100a may include components not illustrated in FIG. 2.

The I/O control unit 110a may receive the input signals IN_SIG and transmit output signals through the I/O bus 200a based on I/O control signals received from the control logic unit 120a. As illustrated in FIG. 2, the I/O control unit 110a may be connected to a plurality of registers 131a through 134a. The I/O control unit 110a may transmit the received input signals IN_SIG to the command register 131a, the address register 132a, the data register 133a and the identifier register 134a, and may receive data from the data register 133a.

Referring to FIG. 2, the control logic unit 120a may receive control signals including a chip enable CE# and first control signals CTRLa. As described above with reference to FIG. 1, the control logic unit 120a may determine whether the control signals CE# and CTRLa satisfy a plurality of predetermined conditions, and control other components of the memory device 100a depending on the conditions satisfied by the control signals CE# and CTRLa. In an exemplary embodiment of the present inventive concept, the first control signals CTRLa may include a command latch enable CLE, an address latch enable ALE, a write enable WE# and a read enable RE#. The term "#" may denote an active low, and may indicate a case when an active state of a signal corresponds to a low level. For example, when the chip enable CE# is at an inactive state, the chip enable CE# may be at a high level, and when the chip enable CE# is at the active state, the chip enable CE# may be at the low level. When the chip enable CE# is at an inactive state, the memory device 100 may not be selected, and when the chip enable CE# is at the active state, the memory device 100 may be selected.

The control logic unit 120a may control the I/O control unit 110a to latch the received input signals IN_SIG to the plurality of registers 131a through 134a, by generating a latch enable LE based on conditions satisfied by the control signals CE# and CTRLa. For example, when the control signals CE# and CTRLa satisfy the first condition, the control logic unit 120a may determine that input signals IN_SIG received by the I/O control unit 110a are commands CMD, and may latch the input signals IN_SIG to the command register 131a. In addition, when the control signals CE# and CTRLa satisfy the second condition, the control logic unit 120a may determine that input signals IN_SIG received by the I/O control unit 110a are addresses ADDR, and may latch the input signals IN_SIG to the address register 132a. In addition, when the control signals CE# and CTRLa satisfy the third condition, the control logic unit 120a may determine that input signals IN_SIG received by the I/O control unit 110a are data DATA, and may latch the input signals IN_SIG to the data register 133a. In addition, when the control signals CE# and CTRLa satisfy the fourth condition, the control logic unit 120a may determine that input signals IN_SIG received by the I/O control unit 110a are identifiers ID_IN, and may latch the input signals IN_SIG to the identifier register 134a.

According to an exemplary embodiment of the present inventive concept, a condition in which the control logic unit 120a determines that the input signals IN_SIG are identifiers ID_IN may be different from other conditions. In other words, the fourth condition may be different from the first through third conditions, and the first through third conditions may also be different each other. Accordingly, the identifier ID_IN may be independently latched from other input signals such as the command CMD, the address ADDR and the data DATA, and an operation of the memory device 100*a* may not be affected by the latching of the identifier ID_IN.

The plurality of registers 131*a* through 134*a* may latch each of values corresponding to input signals IN_SIG received by the I/O control logic unit 110*a* based on the latch enable LE generated by the control logic unit 120*a*. For example, each of the plurality of registers 131*a* through 134*a* may include a plurality of latches controlled by the latch enable LE which is generated by the control logic unit 120*a*, and each of the plurality of latches may be connected to the I/O control unit 110*a*.

The memory cell array 160*a* may include a plurality of memory cells. Each of the plurality of memory cells may store data corresponding to bits greater than one, and may be accessed by the row decoder 170*a* and the column decoder 180*a*. Each of the plurality of memory cells may be a volatile memory cell which may lose stored data in the absence of power, or may be a non-volatile memory cell which may maintain stored data in the absence of power. Below, the memory cell array 160*a* is described as including the plurality of non-volatile memory cells; however, the present inventive concept is not limited thereto. Detailed descriptions on the memory cell array will be given below with reference to FIGS. 3 and 4.

The row decoder 170*a* and the column decoder 180*a* may each select at least one of a plurality of signal lines based on the address ADDR received from the address register 132*a*. For example, the row decoder 170*a* may select at least one of a plurality of word lines in response to a row address included in the address ADDR, and the column decoder 180*a* may select at least one of a plurality of bit lines in response to a column address included in the address ADDR. The read/write circuit 190*a* may be connected to the memory cell array 160*a* through the plurality of bit lines, and may control operations of writing the data DATA received from the data register 133*a* in memory cells or of reading the data DATA stored in memory cells.

The identifier storage 140*a* may store a unique identifier ID_REF of the memory device 110*a*. The unique identifier ID_REF is a value used by the memory controller connected to the memory device 100*a* for accessing the memory device 100*a*. Identifier storages included in each of the plurality of memory devices, which share the I/O bus 200*a* and the plurality of signal lines through which control signals are transmitted, may have unique identifiers different from each other. The memory controller may access the memory device 100*a* by transmitting through the I/O bus 200*a* the identifier identical to the unique identifier ID_REF of the memory device 100*a*.

According to an exemplary embodiment of the present inventive concept, the unique identifier ID_REF may be set up at the outside of the memory device 100*a*, for example, by the memory controller, or during a process of manufacturing the memory device 100*a*. For example, the control logic unit 120*a* of the memory device 100*a* may receive from the memory controller control signals CE# and CTRLa which may satisfy a fifth condition different from the first through fourth conditions. In this case, the control logic unit 120*a* may write values corresponding to input signals received through the I/O bus 200*a* in the identifier storage 140*a*. In addition, the identifier storage 140*a* may be programmed so that it may generate the unique identifier ID_REF during the process of manufacturing the memory device 100*a*. In the former case, when power is supplied to a system including the memory device 100*a*, the memory controller may perform an operation of writing the unique identifier ID_REF in the identifier storage 140*a* by transmitting control signals CE# and CTRLa satisfying the fifth condition and transmitting the identifier identical to the unique identifier ID_REF through the I/O bus 200*a*.

The identifier comparator 150*a* may compare the identifier ID_IN provided by the identifier register 134*a* with the unique identifier ID_REF provided by the identifier storage 140*a*, and may generate a comparison signal CMP depending on a comparison result. In FIG. 2, the identifier comparator 150*a* is illustrated as being arranged outside the control logic unit 120*a*; however, according to an exemplary embodiment of the present inventive concept, the identifier comparator 150*a* may be included in the control logic unit 120*a*.

As illustrated in FIG. 2, the control logic unit 120*a* may receive the comparison signal CMP from the identifier comparator 150*a*, and may set up a mode of the memory device 100*a* based on the comparison signal CMP. For example, when the received identifier ID_IN is determined not to be identical to the unique identifier ID_REF based on the comparison signal CMP, the control logic unit 120*a* may put the memory device 100*a* to a standby mode, in other words, enter the standby mode. In addition, when the received identifier ID_IN is determined to be identical to the unique identifier ID_REF based on the comparison signal CMP, the control logic unit 120*a* may release the memory device 100*a* from the standby mode, in other words, end the standby mode. In addition, according to an exemplary embodiment of the present inventive concept, when the chip enable CE# remains in the inactive state, in other words, at the high level, the control logic unit 120*a* may enter the standby mode, and when the chip enable CE# remains in the active state, in other words, at the low level, the control logic unit 120*a* may end the standby mode.

The memory device 100*a* may maintain an operation state of the standby mode until the standby mode is released. In other words, the memory device 100*a* may operate according to a sequence of signals received from the memory controller. When the memory device 100*a* enters the standby mode before the sequence is completed, the memory device 100*a* may maintain the current operation state of the sequence, and when the standby mode is released, the memory device 100*a* may complete operations corresponding to the sequence by receiving signals remaining in the sequence. When the memory controller controls the plurality of memory devices, operations of the memory devices may be interleaved due to the standby mode; accordingly, the memory controller may more efficiently control the memory devices and thus, may reduce a response time for a request from a host.

The control logic unit 120*a* may set up or release the standby mode by controlling components included in the memory device 100*a*. For example, in the standby mode, the control logic unit 120*a* may control the plurality of registers 131*a* through 134*a* such that input signals IN_SIG received through the I/O bus 200*a* are not latched even when control signals CE# and CTRLa satisfy the first through third conditions. In addition, when the memory device 100*a* enters the standby mode from a read mode, the read mode may be suspended, and the control logic unit 120*a* may later resume the read mode in response to control signals CE# and CTRLa satisfying the fourth condition and the received identifier ID_IN identical to the unique identifier ID_REF.

Figure 3:
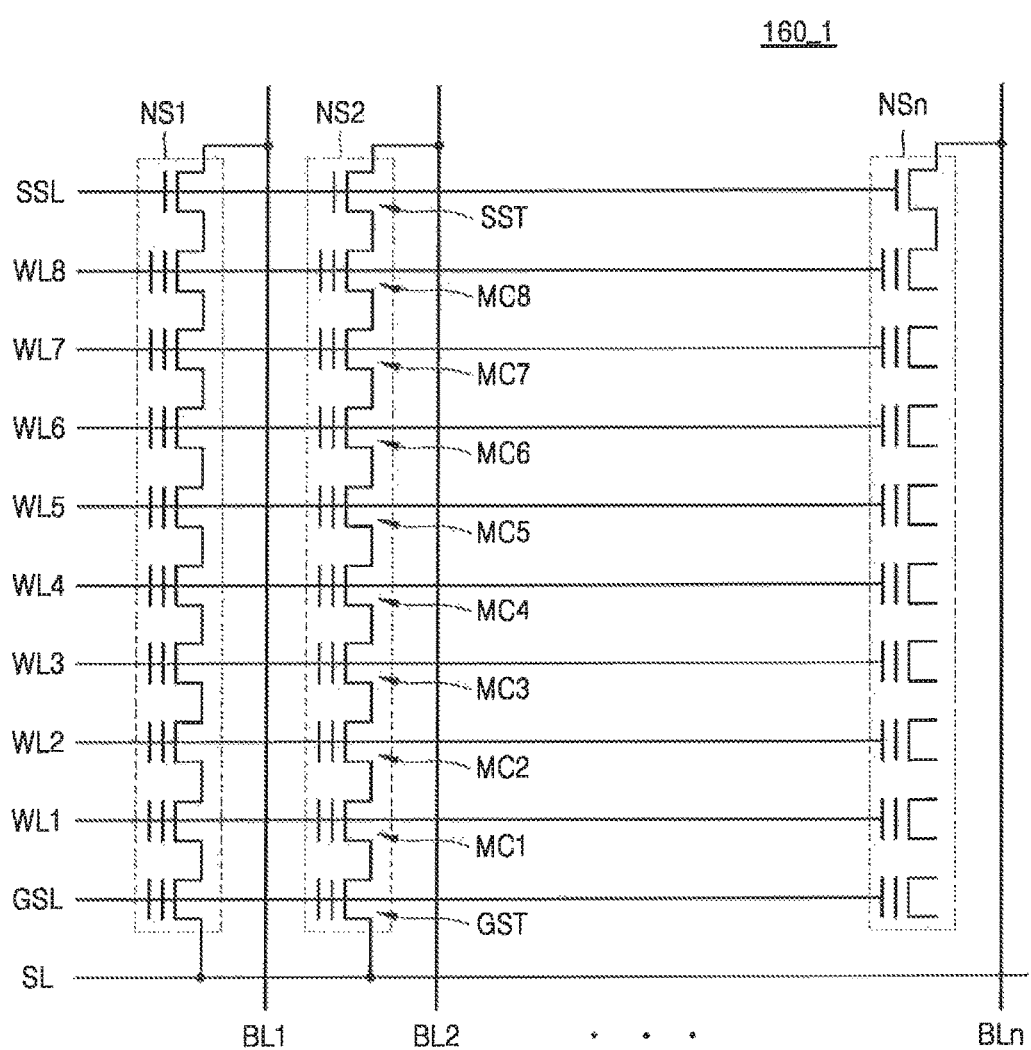
FIG. 3 is a circuit diagram of a memory cell array included in a memory device according to an exemplary embodiment of the present inventive concept.

FIG. 3 is a circuit diagram of an example 160_1 of the memory cell array 160a included in the memory device 100a according to an exemplary embodiment of the present inventive concept. As illustrated in FIG. 3, the memory cell array 160_1 may include planar NAND flash memory cells; however, the present inventive concept is not limited thereto. According to an exemplary embodiment of the present inventive concept, memory cells may include resistive memory cells such as resistive random access memory (RRAM), phase change RAM (PRAM) and magnetic RAM (MRAM). Referring to FIG. 3, the memory cell array 160_1 may include a plurality of transistors, and a plurality of bit lines BL1 through BLn, word lines WL1 through WL8 and select lines SSL, GSL may be arranged in the memory cell array 160_1.

The memory cell array 160_1 may include a plurality of strings or NAND strings NS1 through NSn, each of which may include a plurality of memory cells MC1 through MC8 in a serial connection. Each of the memory cells MC1 through MC8 may have a state corresponding to stored data, for example, a threshold voltage. According to an exemplary embodiment of the present inventive concept, each of the memory cells included in the memory cell array 160_1 may be a multi-level cell (MLC) for storing 2-bit data or a triple-level cell (TLC) for storing 3-bit data. In addition, according to an exemplary embodiment of the present inventive concept, the memory cell may store 4-bit or greater data or may be a single-level cell (SLC) for storing 1-bit data.

Each of the strings NS1 through NSn may include not only memory cells MC1 through MC8 but also a plurality of additional transistors SST, GST supporting operations of writing data in at least one of the memory cells MC1 through MC8 or reading data out of at least one of the memory cells MC1 through MC8. For example, the string NS2 may include a string select transistor SST respectively connected to the memory cell MC8 arranged at the end of the memory cells MC1 through MC8 and to the bit line BL2, and a ground select transistor GST connected to the memory cell MC1 arranged at the other end of the memory cells MC1 through MC8 and to a source line SL. According to an exemplary embodiment of the present inventive concept, the numbers of string select transistors, memory cells and ground select transistors included in a string of the memory cell array 160a in FIG. 2 may be different from the numbers of string select transistors, memory cells and ground select transistors included in a string of the memory cell array 160_1 in FIG. 3.

Each gate of the memory cells MC1 through MC8 may be connected to the plurality of word lines WL1 through WL8, a gate of the string select transistor SST may be connected to the string select line SSL, and a gate of the ground select transistor GST may be connected to the ground select line GSL. The string select transistor SST included in the plurality of strings NS1 through NSn, the memory cells MC1 through MC8 and the ground select transistor GST may be respectively controlled by signals applied to the string select line SSL, the word lines WL1 through WL8 and the ground select line GSL (for example, by the row decoder 170a in FIG. 2).

Figure 4:
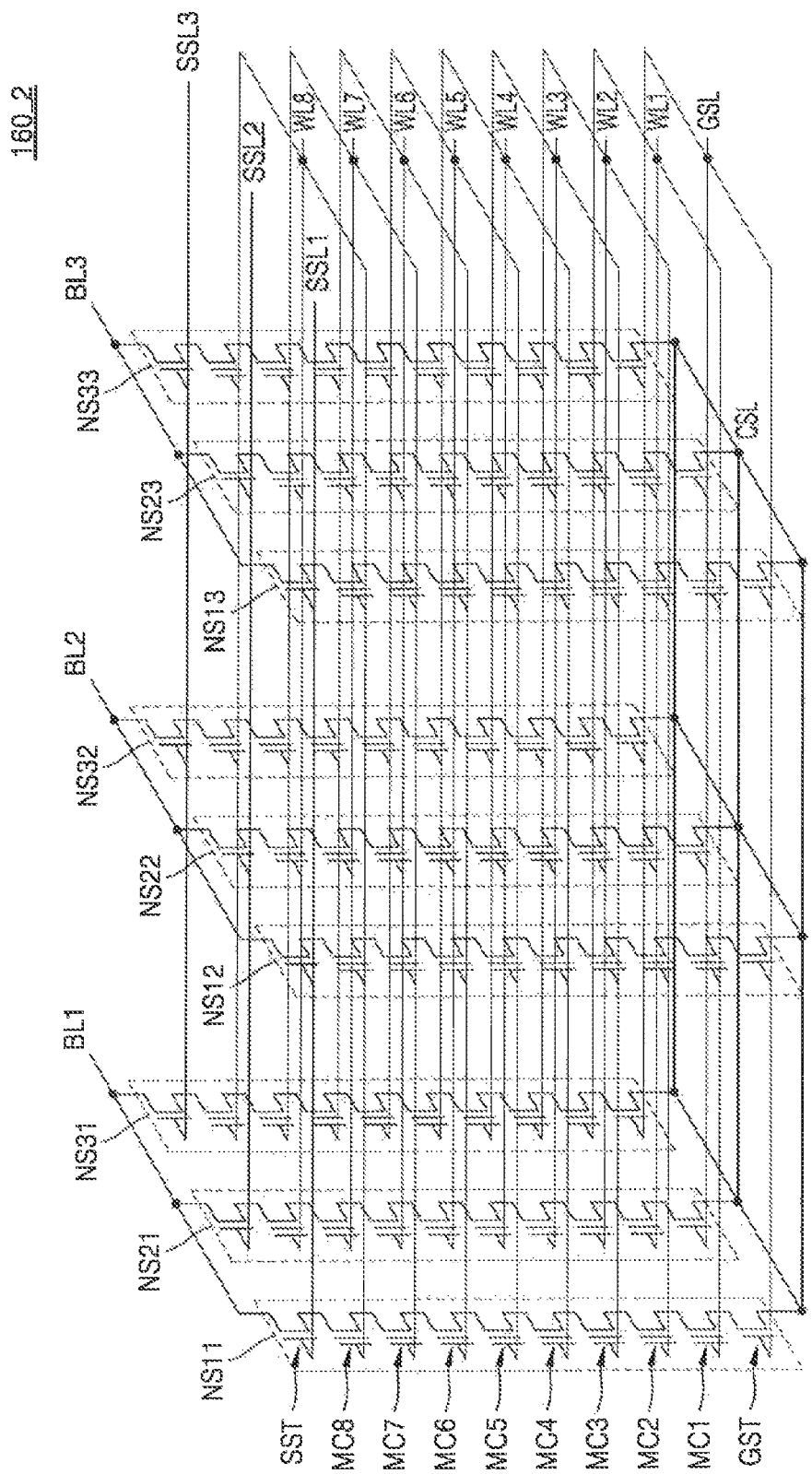
FIG. 4 is a circuit diagram of a memory cell array included in a memory device according to an exemplary embodiment of the present inventive concept.

FIG. 4 is a circuit diagram of an example 160_2 of the memory cell array 160a included in the memory device 100a according to an exemplary embodiment of the present inventive concept. As illustrated in FIG. 4, the memory cell array 160_2 may be a three-dimensional (3D) memory array. The 3D memory array may be monolithically formed in one or more physical levels of arrays of memory cells having an active area disposed above a silicon substrate and circuitry associated with the operation of the memory cells. The associated circuitry may be above or within the substrate. The term "monolithic" may denote that layers of each level of the memory cell array 160_2 are directly deposited on the layers of each underlying level of the memory cell array 160_2.

The following patent documents, which are herein incorporated by reference in their entireties, describe configurations for 3D memory arrays, in which the 3D memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

According to an exemplary embodiment of the present inventive concept, the 3D memory array may include vertical NAND strings which are arranged in a vertical direction so that at least one of the cell transistors may be placed on other cell transistors, and the at least one of the cell transistors may include a charge trap layer. In other words, a plurality of cell transistors may include vertical NAND (VNAND) flash memory cells in a 3D vertical structure.

Referring to FIG. 4, the memory cell array 160_2 may include the plurality of NAND strings NS11 through NS33, the plurality of word lines WL1 through WL8, the plurality of bit lines BL1 through BL3, the ground select line GSL, the plurality of string select lines SSL1 through SSL3 and a common source line CSL. The number of NAND strings, the number of word lines, the number of bit lines, the number of ground select lines and the number of string select lines may variously change depending on an exemplary embodiment of the present inventive concept.

NAND strings NS11, NS21, NS31 may be arranged between the first bit line BL1 and the common source line CSL, NAND strings NS12, NS22, NS32 may be arranged between the second bit line BL2 and the common source line CSL, and NAND strings NS13, NS23, NS33 may be arranged between a third bit line BL3 and the common source line CSL. Each of the NAND strings (for example, NS11) may include the string select transistor SST, the plurality of memory cells MC1 through MC8 and the ground select transistor GST, which are connected in series. Below, the NAND string may be referred to as a string for the sake of convenience.

Strings commonly connected to one bit line may form one column. For example, strings NS11, NS21, NS31 commonly connected to the first bit line BL1 may correspond to a first column, strings NS12, NS22, NS32 commonly connected to the second bit line BL2 may correspond to a second column, and strings NS13, NS23, NS33 commonly connected to the third bit line BL3 may correspond to a third column.

Strings connected to one string select line may form a row. For example, strings NS11, NS12, NS13 connected to the first string select line SSL1 may correspond to a first row, strings NS21, NS22, NS23 connected to the second string select line SSL2 may correspond to a second row, and strings NS31, NS32, NS33 connected to the third string select line SSL3 may correspond to a third row.

Each of the plurality of memory cells MC1 through MC8 may be connected to corresponding word lines WL1 through WL8. The string select transistor SST may be connected to the string select lines SSL1 through SSL3 and the ground select transistor GST may be connected to the ground select line GSL. In addition, the string select transistor SST may be connected to a corresponding bit line BL, and the ground select transistor GST may be connected to the common source line CSL.

Word lines on the same level (for example, WL1) may be commonly connected to each other, and the string select lines SSL1 through SSL3 may be spaced apart from each other. The plurality of NAND strings or the plurality of memory cells, which are connected to a same string line among the plurality of string select lines SSL1 through SSL3, may be referred to as a plane. For example, NAND strings NS11, NS12, NS13 connected to the first string select line SSL1 may be referred to as one plane.

The memory cell to be programmed may be selected by selecting one of the plurality of string select lines SSL1 through SSL3 and one of the plurality of word lines WL1 through WL8. For example, when the first string select line SSL1 is selected and a programmed voltage is applied to the first word line WL1, memory cells may be programmed which are included in the NAND strings NS11, NS12, NS13 of the first row and connected to the first word line WL1.

FIG. 5 is a table illustrating conditions of control signals for latching commands, addresses and data according to an exemplary embodiment of the present inventive concept. In detail, FIG. 5 illustrates first through third conditions which each of the control signals may need to satisfy for latching commands, addresses and data. Below, FIG. 5 is described with reference to FIG. 2.

Referring to FIG. 5, when the chip enable CE# is at the high level, in other words, when the chip enable CE# is in the inactive state, the memory device 100a may remain in the standby state regardless of the states of other control signals. The first through third conditions may be conditions when the chip enable CE# has the low level.

The first condition to latch the command CMD may be a condition in which the command latch enable CLE is at the high level, the address latch enable ALE is at the low level, and when the read enable RE# is at the high level, the write enable WE# is changed from the low level to the high level (in other words, at a rising edge of the write enable WE#). In addition, the second condition to latch the address ADDR may be a condition in which the address latch enable ALE is at the high level, the command latch enable CLE is at the low level, and when the write enable RE# is at the high level, the write enable WE# is changed from the low level to the high level (in other words, at the rising edge of the write enable WE#). In addition, the third condition to latch data DATA may be a condition in which the command latch enable CLE and the address latch enable ALE are respectively at the low level, and when the read enable RE# is at the high level, the write enable WE# is changed from the low level to the high level (in other words, at the rising edge of the write enable WE#).

According to an exemplary embodiment of the present inventive concept, the operation of the memory device 100 may not be affected when latching the identifier, since the identifier is latched when the control signals satisfy a fourth condition different from the first through third conditions. In other words, as will be described below, when a latching condition of the identifier is either the first condition or the second condition, the control logic unit 120a may perform operations such as command decoding and address decoding to terminate the operation in progress in the memory device 100a, and thus, the terminated operation may not be continued. On the other hand, the fourth condition which is different from the first through third conditions may put the memory device 100a in the standby mode, or take the memory device 100a out of the standby mode enable resumption of the terminated operation so that operations in progress in the memory device 100a may not be affected. Below, the first through third conditions may be the same as those described with reference to FIG. 5; however, the first through third conditions may be different from those illustrated in FIG. 5 according to an exemplary embodiment of the present inventive concept.

Figure 6:
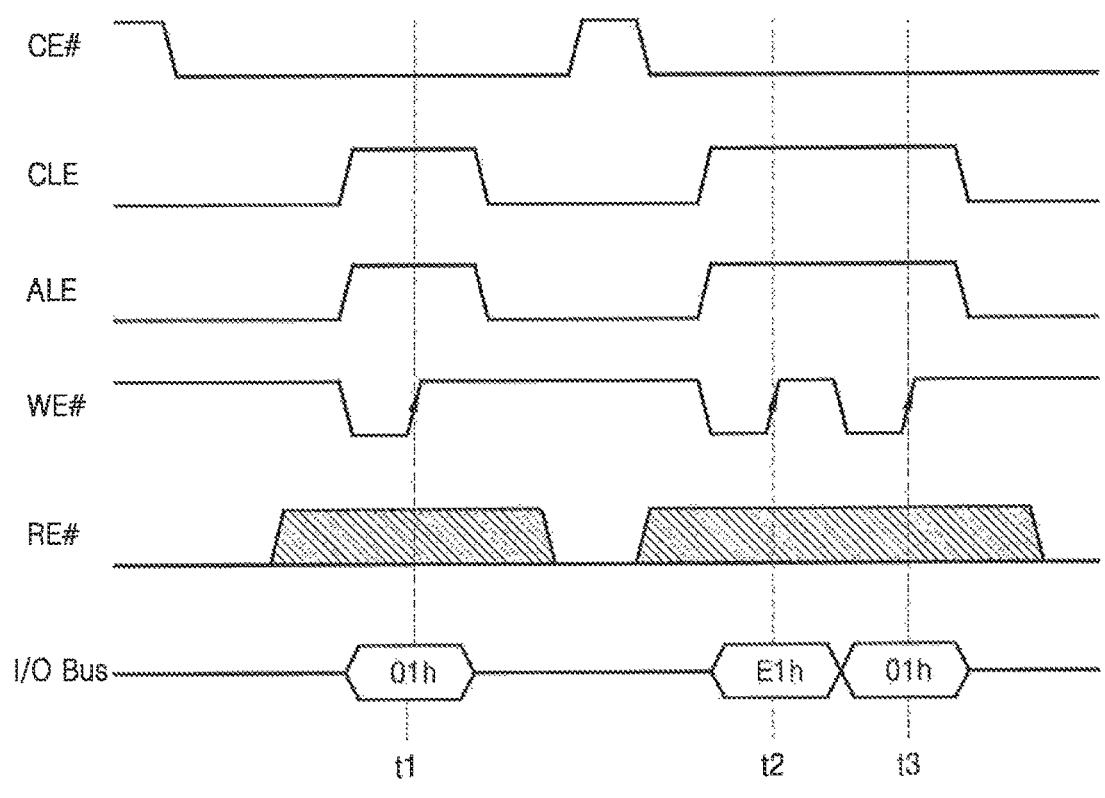
FIGS. 6 and 7 are diagrams illustrating conditions of control signals for acknowledging identifiers in the memory device of FIG. 2 according to an exemplary embodiment of the present inventive concept.
Figure 7:
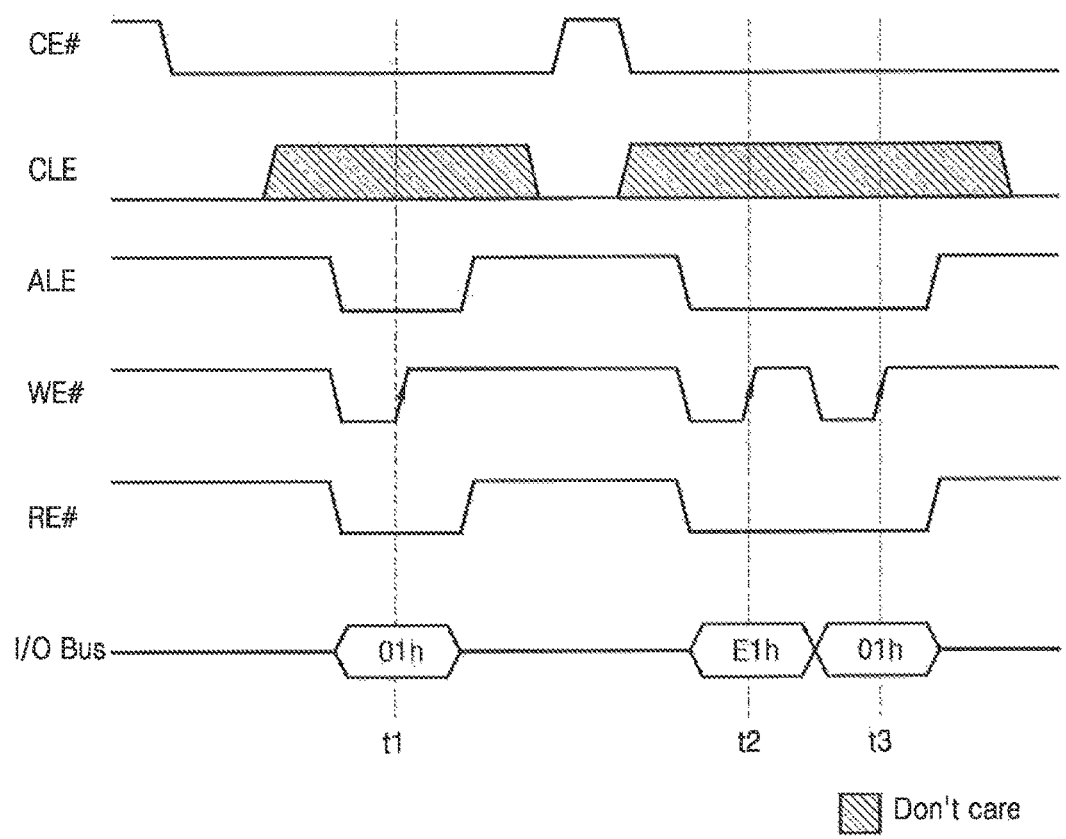

FIGS. 6 and 7 are diagrams illustrating examples of conditions of control signals for acknowledging identifiers in the memory device 100a of FIG. 2 according to an exemplary embodiment of the present inventive concept. Below, examples in FIGS. 6 and 7 are described with reference to FIG. 2. In the examples in FIGS. 6 and 7, it is assumed that the I/O bus 200a includes eight lines and the identifier transmitted by the memory controller is "01h". As described before, the identifier may be latched when control signals satisfy a condition (for example, the fourth condition) different from conditions for latching other input signals such as commands, addresses and data.

Referring to FIG. 6, according to an exemplary embodiment of the present inventive concept, the identifier ID may be latched when the write enable WE# satisfies a condition of being changed from the active state to the inactive state when the chip enable CE#, the address latch enable ALE and the command latch enable CLE are at the active state. In other words, referring to FIG. 6, at a time t1, when the chip enable CE# is at the low level and the command latch enable CLE as well as the address latch enable ALE are at the high level, the "01h" may be determined as the identifier and latched to the identifier register 134a at the instant when the write enable WE# is changed from the low level to the high level (in other words, at the rising edge of the write enable WE#). As illustrated in FIG. 6, the fourth condition for control signals to latch the identifier "01h" may be different from the first through third conditions in FIG. 5.

According to an exemplary embodiment of the present inventive concept, the control logic unit 120a of the memory device 100a may latch the identifier based on a sequence of control signals continuously satisfying the fourth condition. For example, as illustrated in FIG. 6, the control logic unit 120a may latch the identifier based on the sequence of control signals continuously satisfying the fourth condition two times. In other words, at a time t2, the control logic unit 120a may control latching of "E1h" working as a header of the identifier and at a time t3, may control latching of the identifier "01h". The memory device 100a may sequentially latch "E1h" and "01h" and compare the identifier "01h" with the ID_REF.

The read enable RE# is denoted as "don't care" at t1, t2 and t3 in FIG. 6; however, an exemplary embodiment of the present inventive concept is not limited thereto. In other words, the fourth condition may be dependent on the state of the read enable RE#. For example, the fourth condition may further include a condition of the read enable RE# being at the high level, or a condition of the read enable RE# being at the low level.

Referring to FIG. 7, according to an exemplary embodiment of the present inventive concept, the identifier ID may be latched when the write enable WE# satisfies a condition of being changed from the active state to the inactive state when the chip enable CE# and the read enable RE# are at the active state and the address latch enable ALE is at the inactive state. In other words, referring to FIG. 7, at the time t1, when the chip enable CE# and the read enable RE# as well as the address latch enable ALE are at the low level, the "01h" may be determined as the identifier and latched to the identifier register 134a at the instant the write enable WE# is changed from the low level to the high level (in other words, at the rising edge of the write enable WE#). As illustrated in FIG. 7, the fourth condition for latching the identifier "01h" may be different from the first through third conditions in FIG. 5.

Similar to that described before with reference to FIG. 6, the control logic unit 120a may latch the identifier based on the sequence of control signals continuously satisfying the fourth condition two times. In other words, at t2 the control logic unit 120a may control latching of "E1h" working as the header of the identifier and at t3 may control latching of the identifier "01h". The memory device 100a may sequentially latch "E1h" and "01h" and compare the identifier "01h" with the ID_REF.

The command latch enable CLE is denoted as "don't care" at t1, t2 and t3 in FIG. 7; however, an exemplary embodiment of the present inventive concept is not limited thereto. In other words, the fourth condition may be dependent on the state of the command latch enable CLE. For example, the fourth condition may further include a condition of the command latch enable CLE being at the high level, or a condition of the command latch enable CLE being at the low level.

Figure 8:
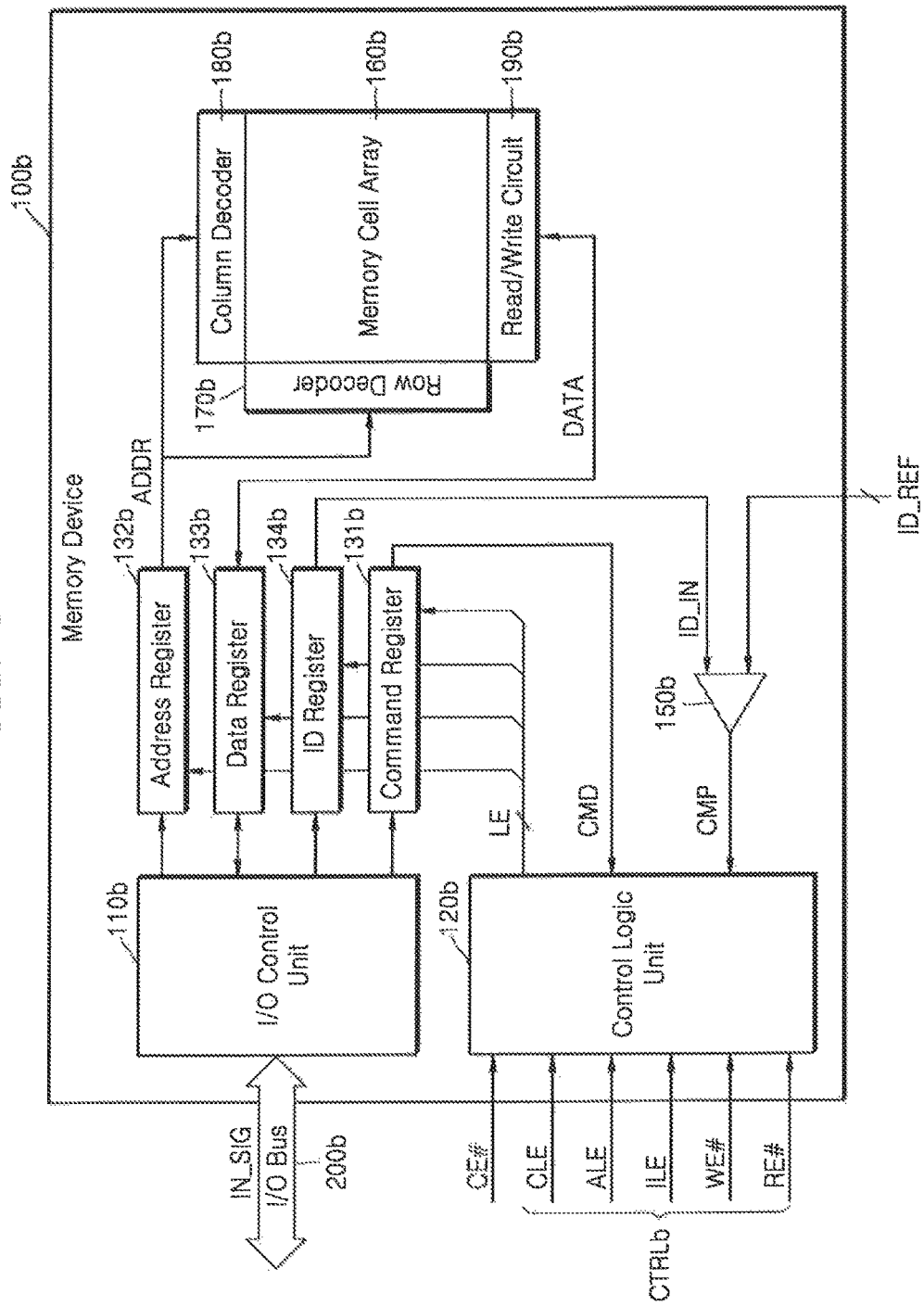
FIG. 8 is a block diagram of the memory device of FIG. 1 according to an exemplary embodiment of the present inventive concept.

FIG. 8 is a block diagram of an example 100b of the memory device 100 of FIG. 1 according to an exemplary embodiment of the present inventive concept. In detail, in comparison with the memory device 100a of FIG. 2, control signals in the example in FIG. 8 may further include an additional control signal, in other words, an identifier ID latch enable ILE, and the unique identifier ID_REF of the memory device 100b may be provided from the outside of the memory device 100b. Referring to FIG. 8, the memory device 100b may include an I/O control unit 110b, a control logic unit 120b, a command register 131b, an address register 132b, a data register 133b, an identifier register 134b, an identifier comparator 150b, a memory cell array 160b, a row decoder 170b, a column decoder 180b and a read/write circuit 190b. In addition, the memory device 100b may include components not illustrated in FIG. 2. Below, descriptions on components of the memory device 100b which are identical or similar to those included in the memory device 100a of FIG. 2 may be omitted.

Referring to FIG. 8, control signals in the present exemplary embodiment may include the chip enable CE# as well as second control signals CTRLb, and the second control signals CTRLb may include the command latch enable CLE, the address latch enable ALE, the identifier latch enable ILE, the write enable WE# and the read enable RE#. In other words, the control logic unit 120b may further receive the identifier latch enable ILE in comparison with the control logic unit 120a in FIG. 2.

As described below with reference to FIG. 9, the fourth condition which denotes that input signals IN_SIG received through an I/O bus 200b are identifiers may be determined by the state of the identifier latch enable ILE. A plurality of memory devices like the memory device 100b may share signal lines of the identifier latch enable ILE, and the memory controller may inform each of the plurality of memory devices of the fact that input signals IN_SIG of the I/O bus 200b are identifiers by transmitting signals to signal lines of the identifier latch enable ILE. Accordingly, each of the plurality of memory devices may determine input signals IN_SIG received through the I/O bus 200b as identifiers and compare them with its own unique identifier ID_REF.

Referring to FIG. 8, the unique identifier ID_REF of the memory device 100b may be provided from the outside of the memory device 100b. For example, the memory device 100b may be one of a plurality of memory chips manufactured through a semiconductor manufacturing process, and the plurality of memory chips may be packaged to form one semiconductor memory package. Memory chips may be placed onto a board and may respectively have at least one pin to receive the unique identifier ID_REF. The board may be patterned for different signals (for example, voltages) to be applied to pins of the memory chips depending on locations of the memory chips, and accordingly, each of the memory chips may receive unique identifiers different from each other.

According to an exemplary embodiment of the present inventive concept, components of the memory device 100a of FIG. 2 and those of the memory device 100b of FIG. 8 may be combined with each other. In other words, the memory device 100a of FIG. 2 may receive the unique identifier ID_REF from the outside of the memory device 100a, like the memory device 100b of FIG. 8, and the memory device 100b of FIG. 8 may include the identifier storage 140a of the memory device 100a of FIG. 2.

Figure 9:
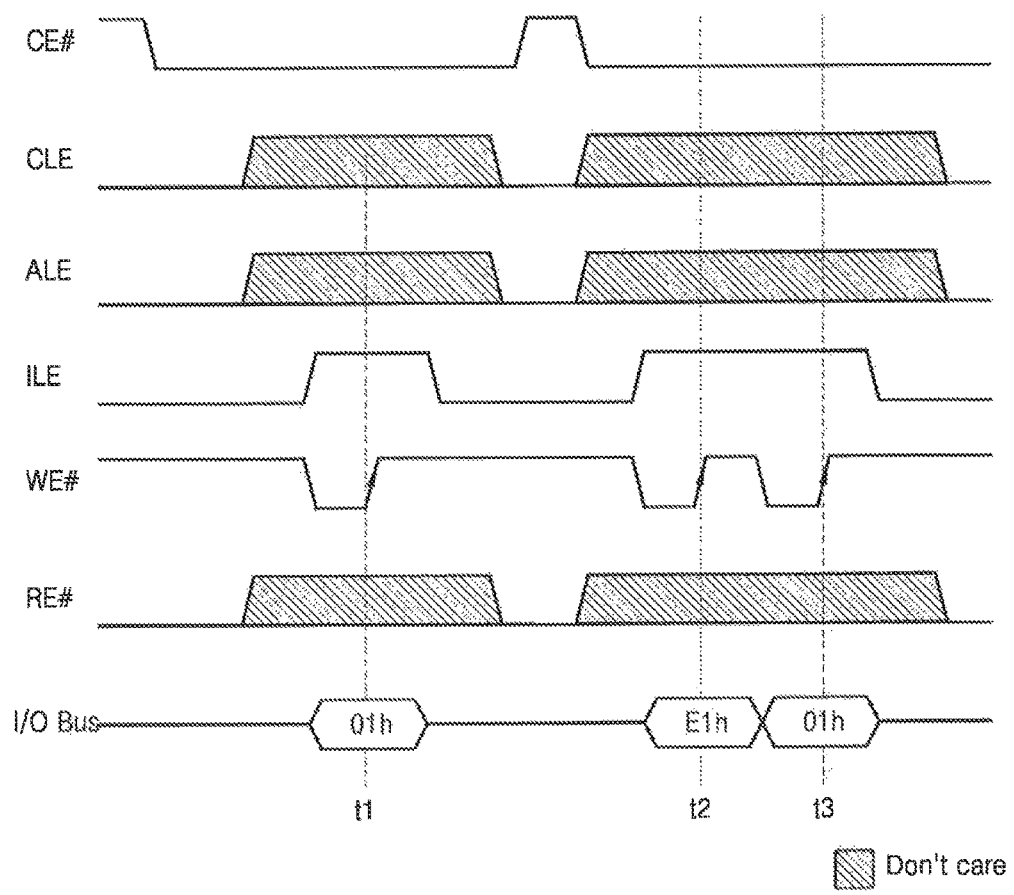
FIG. 9 is a diagram illustrating conditions of control signals for acknowledging identifiers in the memory device of FIG. 8 according to an exemplary embodiment of the present inventive concept.

FIG. 9 is a diagram illustrating examples of conditions of control signals for acknowledging identifiers in the memory device 100b of FIG. 8 according to an exemplary embodiment of the present inventive concept. Below, examples in FIG. 9 are described with reference to FIG. 8. In FIG. 9, it is assumed that the I/O bus 200b includes eight lines and the identifier transmitted by the memory controller is "01h". This is similar to that described with reference to FIG. 6. As described before, the identifier may be latched when control signals satisfy a condition (for example, the fourth condition) different from conditions for latching other input signals such as commands, addresses and data.

Referring to FIG. 9, according to an exemplary embodiment of the present inventive concept, the identifier ID may be latched when the write enable WE# satisfies a condition of being changed from the active state to the inactive state when the chip enable CE# as well as the identifier latch enable ILE are at the active state. In other words, referring to FIG. 9, at t1 when the chip enable CE# is at the low level and the identifier latch enable ILE are at the high level, the "01h" may be determined as the identifier and latched to the identifier register 134b at the instant when the write enable WE# is changed from the low level to the high level (in other words, on the rising edge of the write enable WE#). As illustrated in FIG. 9, the fourth condition for control signals to latch the identifier "01h" may be different from the first through third conditions in FIG. 5.

According to an exemplary embodiment of the present inventive concept, the control logic unit 120b of the memory device 100b may latch the identifier based on a sequence of control signals continuously satisfying the fourth condition. For example, as illustrated in FIG. 9, the control logic unit 120b may latch the identifier based on the sequence of control signals continuously satisfying the fourth condition two times. In other words, at t2 the control logic unit 120b may control latching of "E1h" working as a header of the identifier and at t3 may control latching of the identifier "01h". The memory device 100b may sequentially latch "E1h" and "01h" and compare the identifier "01h" with the ID_REF.

The command latch enable CLE, the address latch enable ALE and the read enable RE# are respectively denoted as "don't care" at t1, t2 and t3 in FIG. 9; however, an exemplary embodiment of the present inventive concept is not limited thereto. In other words, the fourth condition may be dependent on at least one state of the command latch enable CLE, the address latch enable ALE and the read enable RE#. For example, the fourth condition may further include a condition when the command latch enable CLE and the address latch enable ALE are at the inactive state.

Figure 10:
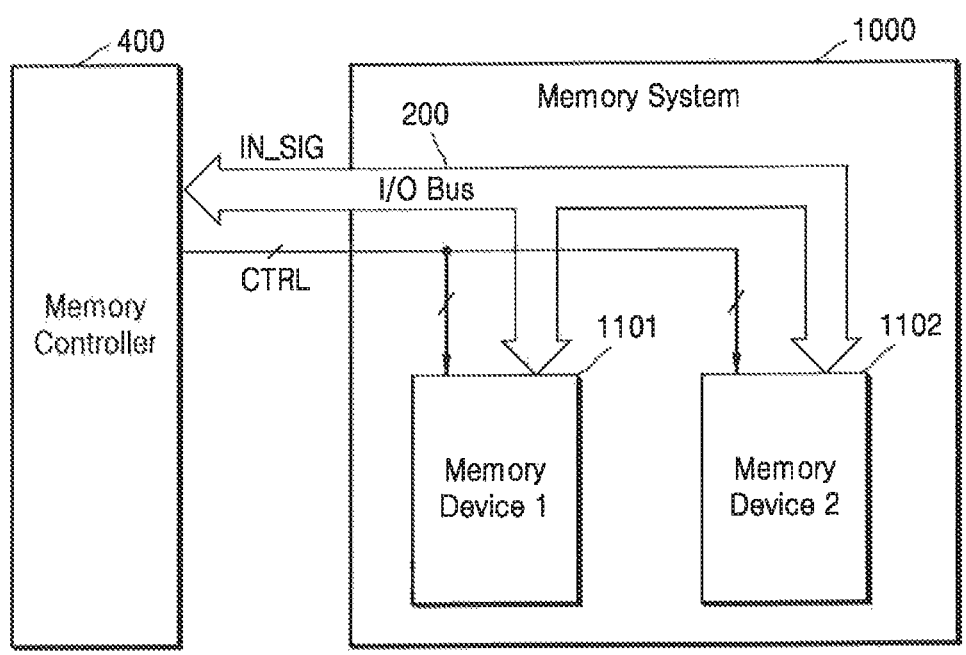
FIG. 10 is a block diagram illustrating a memory system including a plurality of memory devices according to an exemplary embodiment of the present inventive concept.

FIG. 10 is a diagram illustrating a memory system including a plurality of memory devices according to an exemplary embodiment of the present inventive concept. The memory system 1000 may share an I/O bus 200 and a plurality of signal lines through which control signals CTRL move. Signal lines through which signals move to access a first and a second memory system 1101 and 1102 may be referred to as channels and the channel may include the I/O bus 200 and the plurality of signal lines through which control signals CTRL move. In FIG. 10, the first and second memory devices 1101 and 1102 may be connected to an identical channel.

The plurality of memory devices 1101 and 1102 included in the memory system 1000 may be controlled by a memory controller 400. As illustrated in FIG. 10, the memory controller 400 may be connected to the plurality of memory devices 1101 and 1102 through the I/O bus 200 and the plurality of signal lines, transmit input signals IN_SIG through the I/O bus 200, and transmit control signals CTRL through the plurality of signal lines.

As described before, the memory controller 400 may independently access each of the memory devices 1101 and 1102 connected to an identical channel by transmitting control signals and the identifier satisfying the fourth condition through the channel. In addition, the memory devices 1101 and 1102 may simplify an interconnection between the memory controller 400 and memory devices 1101 and 1102. For example, the interconnection may be a channel and the simplification may be from sharing the chip enable CE#.

In FIG. 10, the memory system 1000 is illustrated as including the plurality of memory devices 1101 and 1102 and the memory controller 400 is illustrated as being outside the memory system 1000; however, the memory system 1000 may include the memory controller 400. For example, the memory system 1000 may be a storage communicating with hosts such as a memory card and a solid state drive (SSD) and include the memory controller 400 as well as memory devices that share the I/O bus 200 and signal lines.

Figure 11A:
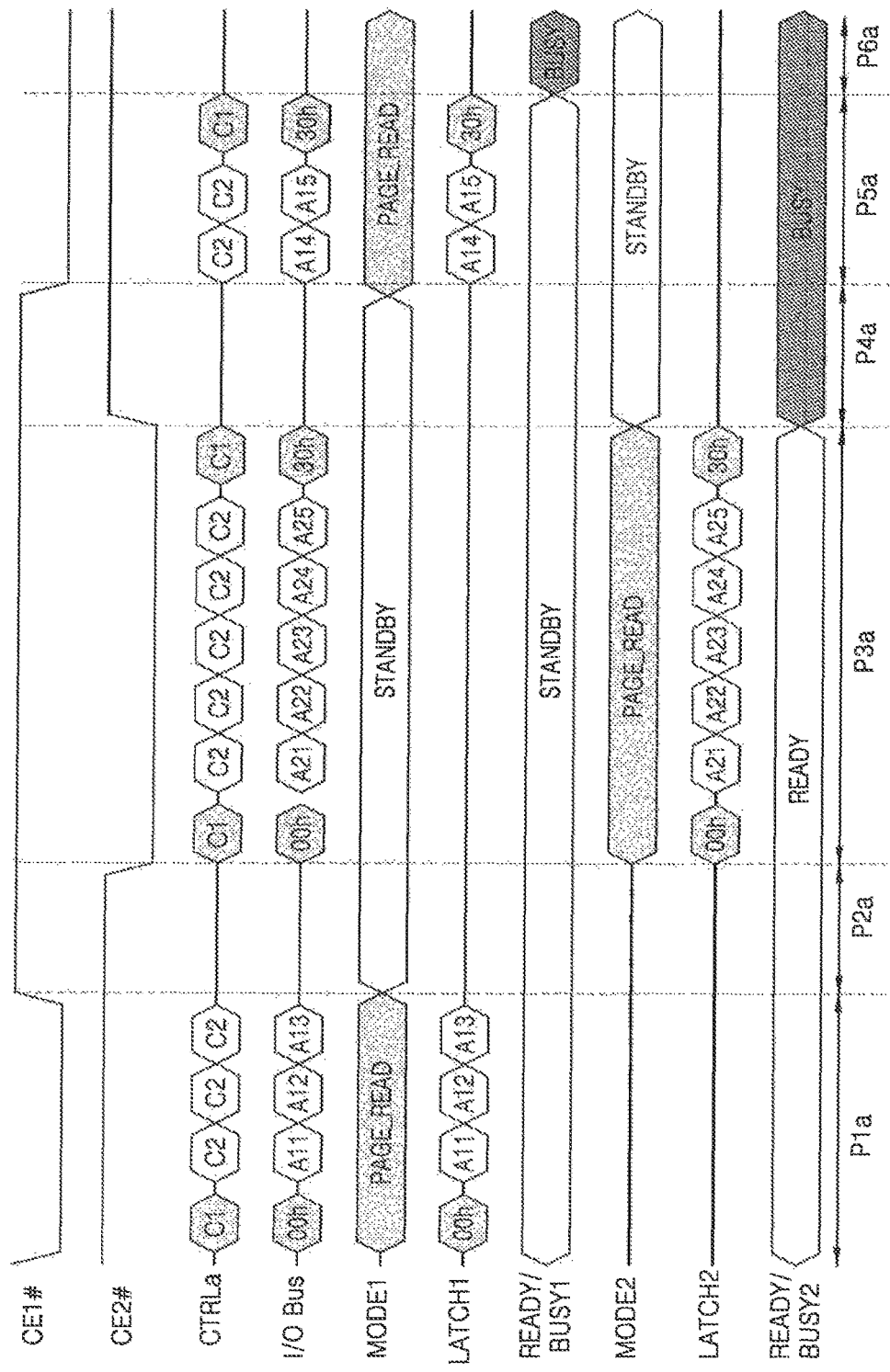
FIGS. 11a and 11b are diagrams illustrating operations of signals between a memory controller and memory devices.
Figure 11B:
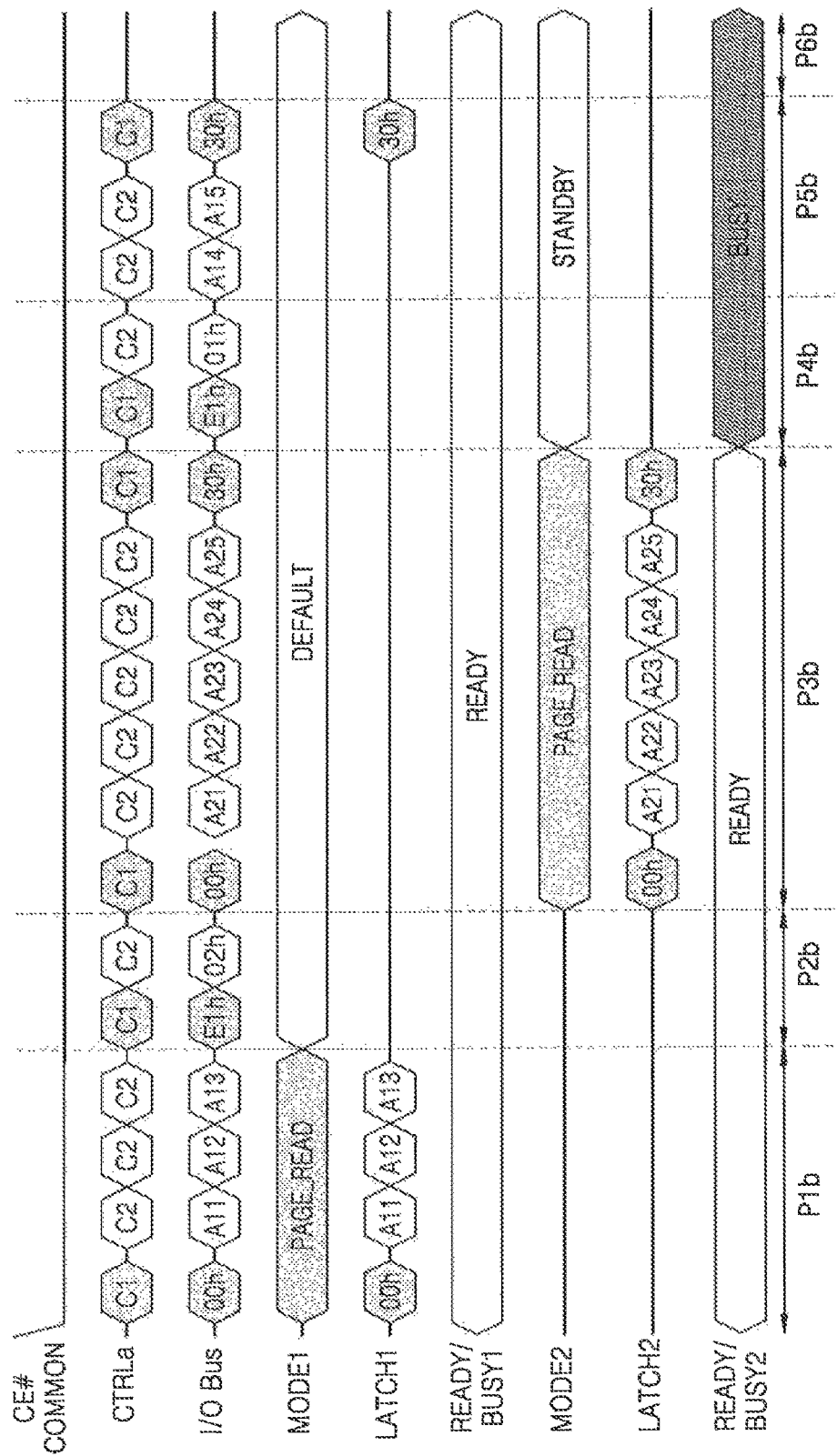

FIGS. 11a and 11b are diagrams illustrating operations of signals between a memory controller and memory devices. In detail, FIG. 11a describes an interleaving of operations for a plurality of memory devices. FIG. 11a also illustrates operations of signals between the memory controller and the memory devices in an example in which the memory devices may independently receive the chip enable from the memory controller, in other words, the memory devices do not share the chip enable. In addition, FIG. 11b illustrates operations of signals between the memory controller and the memory devices in an example in which the memory devices may share the chip enable but acknowledge identifiers of the memory devices by using at least one of the first through third conditions. In FIGS. 11a and 11b, "MODE1" denotes an operation mode of a first memory device, "LATCH1" denotes input signals latched in the first memory device, and "READY/BUSY1" denotes a response state of the first memory device with respect to the memory controller. Similarly, "MODE2", "LATCH2" and "READY/BUSY2" denote corresponding information of a second memory device. In addition, "01h" and "02h" may respectively correspond to unique identifiers of the first and second memory devices.

As illustrated in FIG. 11a, the first memory device may receive a first chip enable CE#1, and the second memory device may receive a second chip enable CE#2. Accordingly, the first and second memory devices may be independently controlled, and operations for the first and second memory devices may be interleaved.

Referring to FIG. 11a, in a range of P1a, the memory controller may transmit control signals CE#1 and CTRLa satisfying the first condition and a command "00h" for a page reading operation. Following the command, the memory controller may transmit a sequence of control signals CE#1 and CTRLa satisfying the second condition and addresses A11 through A13. The first memory device may latch the command "00h" and the addresses A11 through A13 in accordance with the first chip enable CE#1 at an active state. On the other hand, the second memory device may ignore the command "00h" and the addresses A11 through A13 in accordance with the second chip enable CE#2 at an inactive state.

In a range of P2a, the memory controller may change the first chip enable CE#1 to the inactive state and the second chip enable CE#2 to the active state for a page reading operation for the second memory device. For example, the memory controller may receive a read request with a high priority from the host, and when data corresponding to the received read request is stored in the second memory device, the memory controller may terminate the reading operation for the first memory device and initiate the reading operation for the second memory device.

In a range of P3a, the memory controller may perform the page reading operation for the second memory device. Since a transmission of the command as well as addresses A21-A25 for the page reading operation for the second memory device have been completed in the range of P3a, after the completion of the range of P3a as illustrated in FIG. 11a, the second memory device may enter a "BUSY" state in which operations corresponding to the received command as well as addresses may be performed.

In a range of P4a, the memory controller may change the first chip enable CE#1 to the active state and the second chip enable CE#2 to the inactive state for resuming the page reading operation for the first memory device.

In a range of P5a, the memory controller may complete the transmission of addresses A14 and A15 as well as the command for the page reading operation for the first memory device. Since the transmission of the command as well as addresses for the page reading operation for the first memory device is complete, in a range of P6a, the first memory device may normally enter the "BUSY" state in which operations corresponding to the received command as well as address are performed. In other words, even when the page reading operation for the second memory device has been performed before the page reading operation for the first memory device has been completed, the first memory device may normally complete the page reading operation by performing remaining operations for its page reading operation.

As illustrated in FIG. 11b, the first and second memory devices may share the chip enable CE#. In other words, the first and second memory devices may receive identical chip enables CE# from the memory controller. In addition, the first and second memory devices may latch the identifier when the control signal CTRLa satisfies the first and second conditions two or more times consecutively. Descriptions on content similar to the example illustrated in FIG. 11a may hereafter be omitted.

Referring to FIG. 11b, in a range of P2b, the memory controller may transmit control signals CE# and CTRLa satisfying the first condition and a command "E1h" for the page reading operation for the second memory device. The command "E1h" may inform that a following address may be the identifier of the memory device. Following the command, the memory controller may transmit control signals CE# and CTRLa satisfying the second condition and an identifier "02h". At this time, the first memory device may perform a command decoding operation in accordance with control signals CE# and CTRLa satisfying the first condition, and may perform the command decoding operation in accordance with control signals CE# and CTRLa satisfying the second condition. As a result, the page reading operation processed in a range of P1b may be terminated, and the first memory device may enter a default mode in which a new command may be received from the memory controller.

In a range of P4b, the memory controller may transmit control signals CE# and CTRLa satisfying the first condition and the command "E1h" to resume the page reading operation for the first memory device. The command "E1h" may indicate that the next address may be the identifier of the memory device. Following the command, the memory controller may transmit control signals CE# and CTRLa satisfying the second condition and the identifier "01h".

In a range of P5b, the memory controller may transmit addresses such as A14 and A15, which have not been transmitted in the range of P1b, to complete the page reading operation for the first memory device. However, since the first memory device may be in the default mode where a new command may be latched, addresses such as A14 and A15 may not be latched. Rather, a command "30h" may be latched and decoded, but may be ignored because the command "30h" may be acknowledged as a termination command for the page reading operation. Accordingly, the page reading operation for the first memory device may not be normally terminated. In other words, the state of the first memory device may not be changed to the "BUSY" state, but may be maintained at a "READY" state.

Figure 12:
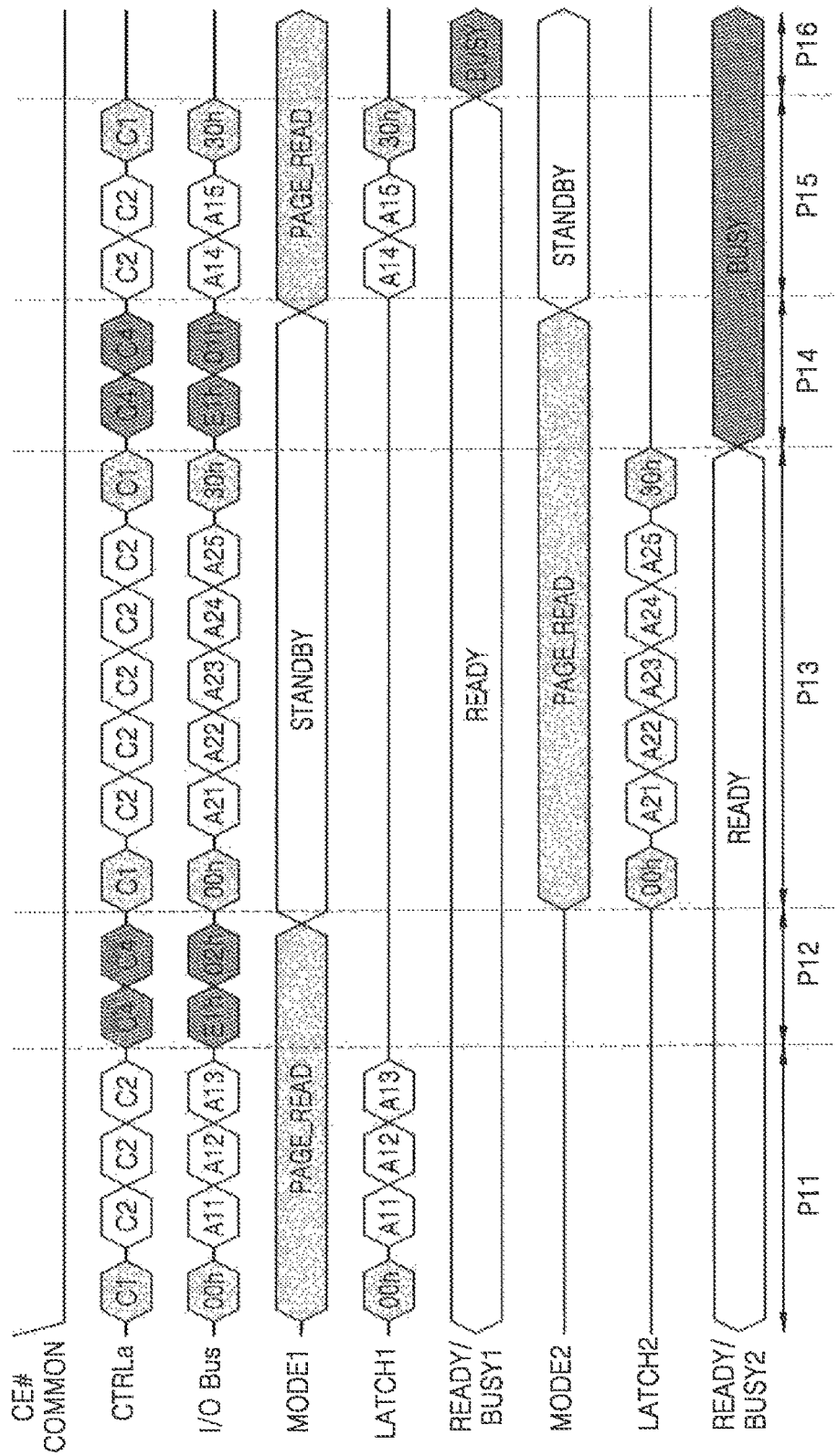
FIG. 12 is a diagram illustrating operations of signals between a memory controller and memory devices according to an exemplary embodiment of the present inventive concept.

FIG. 12 is a diagram illustrating operations of signals between the memory controller and the memory devices according to an exemplary embodiment of the present inventive concept. In detail, FIG. 12 is a diagram illustrating operations of signals between the first and second memory devices 1101 and 1102 and the memory controller 400 included in the memory system 1000 of FIG. 10. As described above, the first and second memory devices 1101 and 1102 may share the I/O bus 200, and the plurality of signal lines through which control signals including the chip enable may move. Below, descriptions on content similar to examples illustrated in FIGS. 11a and 11b may be omitted.

Referring to FIG. 12, in a range of P12, the memory controller 400 may transmit control signals CE# and CTRLa satisfying the fourth condition and the header "E1h" for the page reading operation for the second memory device 1102. The header "E1h" may indicate that the next input signals may be the identifier of the memory device. Following the header, the memory controller 400 may transmit control signals CE# and CTRLa satisfying the fourth condition and an identifier "02h". At this time, the first memory device 1101 may latch the identifier "02h" based on control signals CE# and CTRLa satisfying the fourth condition, and since the identifier "02h" is different from its own unique identifier "01h", the first memory device 1101 may suspend the page reading operation and enter the standby mode. In addition, the second memory device 1102 may latch the identifier "02h" based on control signals CE# and CTRLa satisfying the fourth condition, and since the identifier "02h" is identical with its own unique identifier "02h", the second memory device 1102 may begin the page reading operation.

In a range P14, the memory controller 400 may transmit control signals CE# and CTRLa satisfying the fourth condition and the header "E1h" to resume the page reading operation for the first memory device 1101, and may transmit control signals CE# and CTRLa satisfying the fourth condition and the identifier "01h", following the header. At this time, the second memory device 1102 may suspend the page reading operation and enter the standby mode, and the first memory device 1101 may end its standby mode and resume its reading operation.

In a range of P15, the memory controller 400 may complete transmission of addresses A14 and A15 and the command for the page reading operation for the first memory device 1101. When the transmission of the command and addresses is completed for the page reading operation for the first memory device 1101, in a rage of P16, the first memory device 1101 may normally enter the "BUSY" state in which the operation in accordance with the received command and addresses may be performed. Accordingly, not only may the channel be simplified, but simultaneously operations of the first and second memory devices 1101, 1102 may be normally interleaved.

Figure 13:
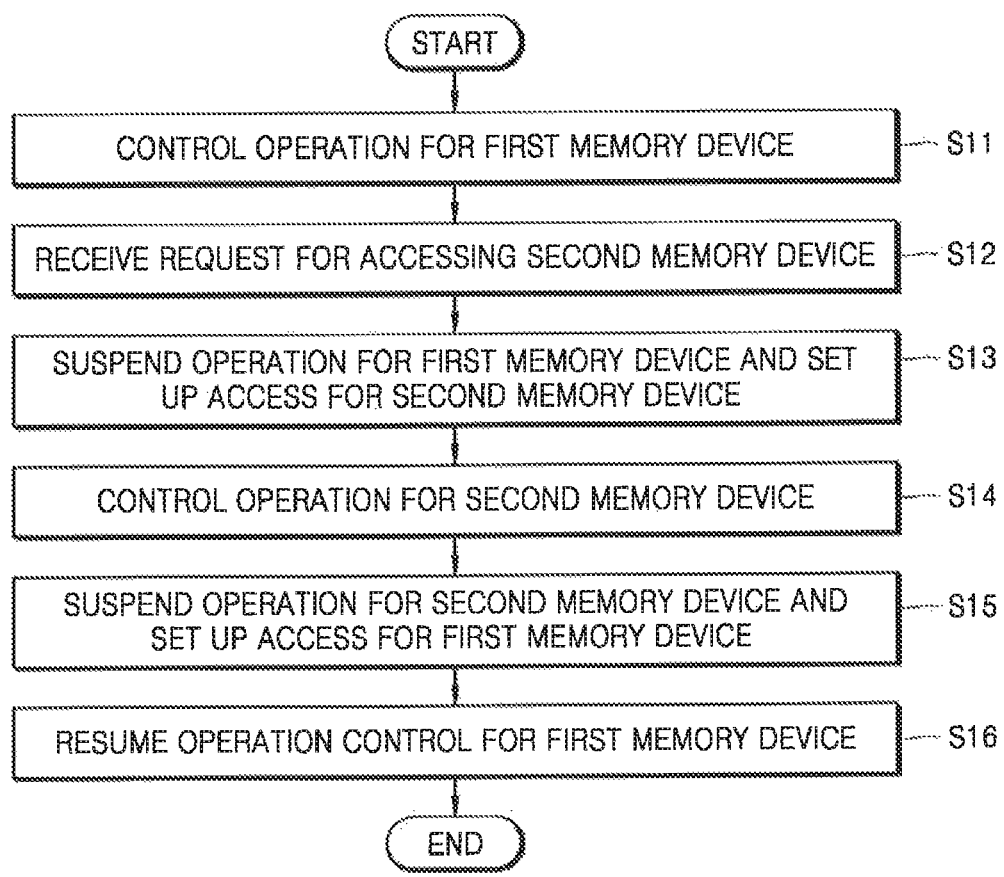
FIG. 13 is a flowchart illustrating an operation method of the memory controller in FIG. 10 according to an exemplary embodiment of the present inventive concept.

FIG. 13 is a flowchart illustrating an operation method of the memory controller 400 in FIG. 10 according to an exemplary embodiment of the present inventive concept. In detail, FIG. 13 is a flowchart illustrating an operation method of the memory controller 400 in an interleaving process of operations of the first and second memory devices 1101 and 1102. Below, FIG. 13 is described with reference to FIG. 10, and operations of the first and second memory devices 1101 and 1102 will be described using reading operations as examples.

In operation S11, the memory controller 400 may control the operation for the first memory device 1101. For example, the memory controller 400 may transmit a reading command and an address to read data stored in the first memory device 1101.

In operation S12, the memory controller 400 may receive a request for accessing the second memory device 1102. For example, the memory controller 400 may receive a request (for example, a read request) for data related to the second memory device 1102 from the host, and the operation related to the request for the second memory device 1102 may have a higher priority than the operation for the first memory device 1101.

In operation S13, the memory controller 400 may suspend reading of the first memory device 1101, and set up an access for the second memory device 1102. For example, the memory controller 400 may transmit control signals satisfying the fourth condition and the unique identifier of the second memory device 1102. Accordingly, the first memory device 1101 may suspend its read operation, and remain in a suspended state.

In operation S14, the memory controller 400 may control the operation for the second memory device 1102. For example, the memory controller 400 may transmit the reading command and the address to read data stored in the second memory device 1102.

In operation S15, the memory controller 400 may suspend the reading operation for the second memory device 1102, and set up an access for the first memory device 1101. For example, the memory controller 400 may transmit control signals satisfying the fourth condition and the unique identifier of the first memory device 1101. Accordingly, the second memory device 1102 may suspend the reading operation, and enter a suspended state.

In operation S16, the memory controller 400 may resume an operation control for the first memory device 1101. In other words, the memory controller 400 may resume the reading operation of the first memory device 1001 from the state, where the reading operation had been suspended at S13, so that the remaining operations of the reading operation can be performed.

Figure 14:
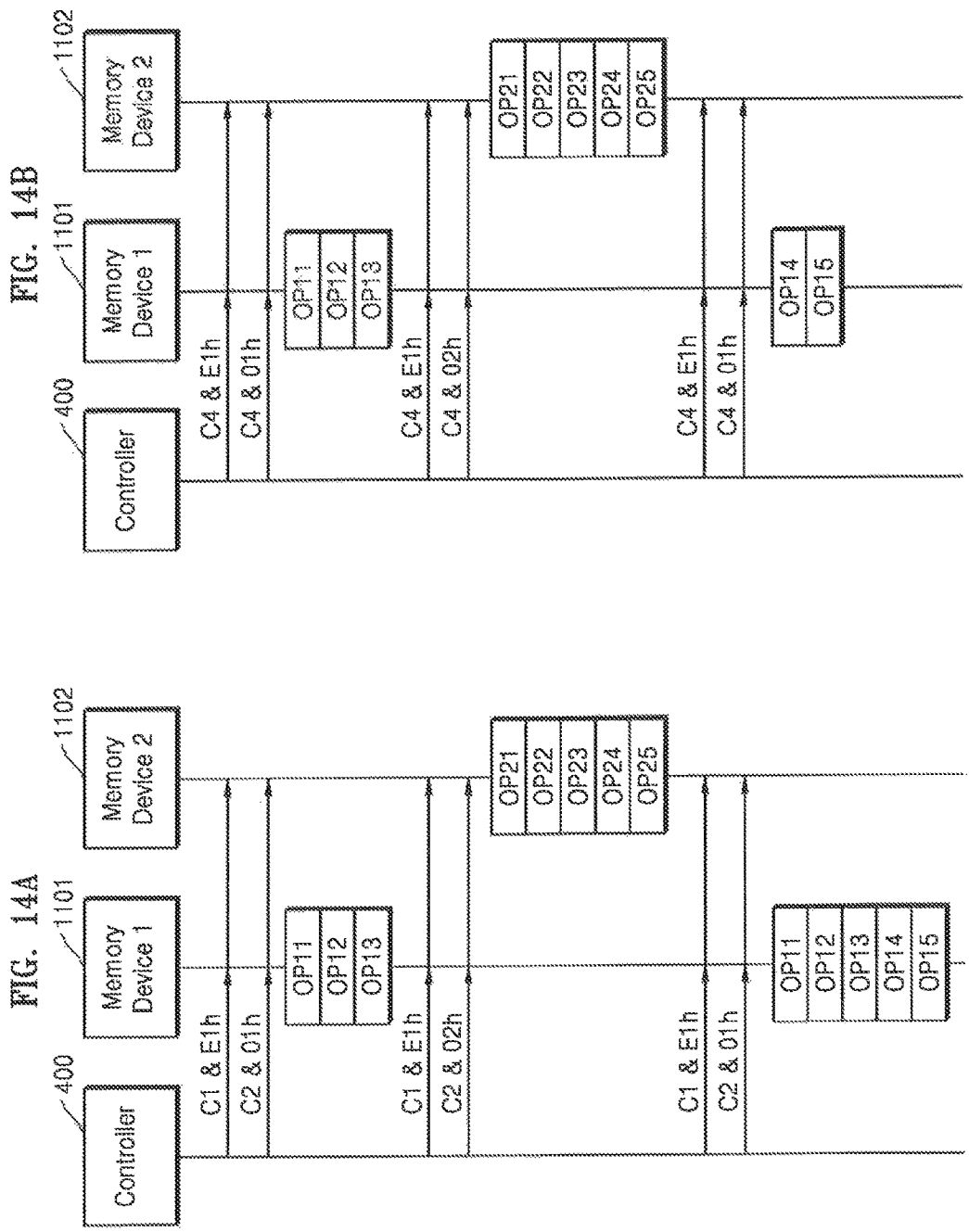
FIGS. 14A and 14B are diagrams illustrating operations of the memory controller in FIG. 10 accessing first and second memory devices according to an exemplary embodiment of the present inventive concept.

FIGS. 14A and 14B are diagrams illustrating an operation of the memory controller 400 in FIG. 10 in accessing the first and second memory devices 1101 and 1102 according to an exemplary embodiment of the present inventive concept. In detail, FIG. 14A illustrates an example in which the memory controller 400 may transmit the identifier of the memory device using the first and second conditions, as illustrated in FIG. 11b, and FIG. 14B illustrates an example in which the memory controller 400 may transmit the identifier of the memory device using the fourth condition, as illustrated in FIG. 12. Although not illustrated, each of a plurality of operations OP11 through OP15, and OP21 through OP25 in FIG. 14 may be initiated in accordance with a signal received from the memory controller 400. Below, the transmission of control signals satisfying a particular condition may be referred to as the transmission of the particular condition.

Referring to FIG. 14A, a first condition C1 and "E1h" are transmitted for accessing the first memory device 1101, and a second condition C2 and "01h" may be subsequently transmitted. After completion of operations OP11 through OP13 for the first memory device 1101, the first condition C1 and "E1h" may be transmitted for accessing the second memory device 1102, and the second condition C2 and "02h" may be subsequently transmitted. As described above, the first memory device 1101 may decode "E1h" and latch "02h" to the address register, and thus, may lose information about previously performed operations OP11 through OP13.

After completion of operations OP21 through OP25 for the second memory device 1102, the first condition C1 and "E1h" are transmitted for accessing the first memory device 1101, and the second condition C2 and "01h" may be subsequently transmitted. Since information about previously performed operations OP11 through OP13 has been lost, operations OP11 through OP13 may be resumed and other operations OP14, OP15 may be performed.

Referring to FIG. 14B, a fourth condition C4 and "E1h" are transmitted for accessing the first memory device 1101, and the fourth condition C4 and "01h" may be subsequently transmitted. After completion of operations OP11 through OP13 for the first memory device 1101, the fourth condition C4 and "E1h" may be transmitted for accessing the second memory device 1102, and the fourth condition C4 and "02h" may be subsequently transmitted. As described above, the first memory device 1101 may latch the identifier in response to the fourth condition C4 and compare the identifier with its unique identifier, and thus, previously performed operations OP1 and OP3 may be free from repeating operations such as latching and comparison of the identifier. Accordingly, the first memory device 1101 may be maintained in a state in which the operations OP11 through OP13 are complete.

After completion of operations OP21 through OP25 for the second memory device 1102, the fourth condition C4 and "E1h" may be transmitted for accessing the first memory device 1101, and the fourth condition C4 and "01h" may be subsequently transmitted. Since the first memory device 1101 may be maintained in a state in which the previously performed operations OP11 through OP13 have been completed, other operations OP14 and OP15 may be performed. Accordingly, a completion time of operations OP11 through OP15 and OP21 through OP25 for the first and second memory devices 1101 and 1102 may be reduced in the example of FIG. 14B, in comparison with that in an example of FIG. 14A.

Figure 15:
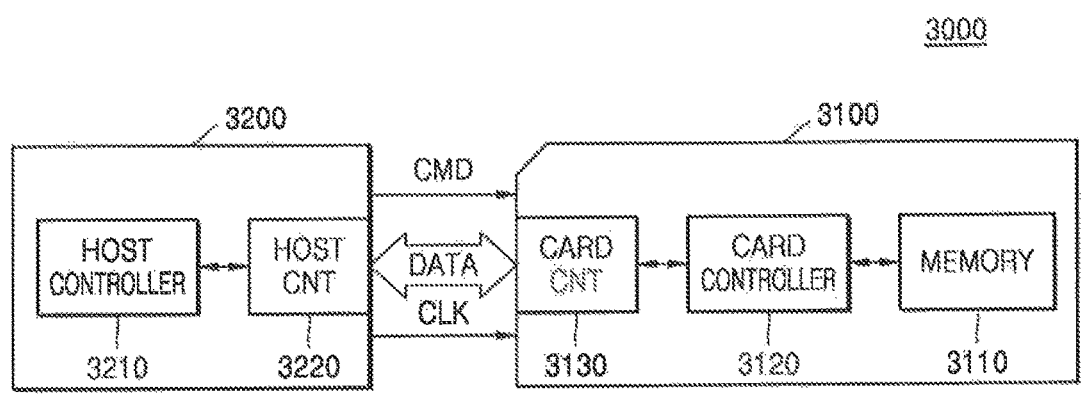
FIG. 15 is a block diagram illustrating a memory system, which includes memory devices according to an exemplary embodiment of the present inventive concept, being applied to a memory card system.

FIG. 15 is block diagram illustrating a memory system including memory devices according to an exemplary embodiment of the present inventive concept being applied to a memory card system 3000. Referring to FIG. 15, the memory card system 3000 may include a host 3200 and a memory card 3100.

The host 3200 may include a host memory controller 3210 and a host connector 3220. The memory card 3100 may include a card connector 3130, a card memory controller 3120 and memory systems 3110. The memory systems 3110 included in the memory card 3100 may share channels connected to the card memory controller 3120, or may be realized by using the exemplary embodiments illustrated in FIGS. 1 through 4. According to the current exemplary embodiment, channels between the card memory controller 3120 and the memory systems 3110 may be simplified and, at the same time, operations of each of the memory systems 3110 may be interleaved. Accordingly, a response time of the memory card 3100 to a request from the host 3200 may be increased.

The host 3200 may store data in the memory card 3100 or read data stored in the memory card 3100. The host memory controller 3210 may transmit a request, for example, a command CMD, a clock signal CLK generated in a clock generator in the host 3200 and data DATA to the memory card 3100 through the host connector 3220.

The card memory controller 3120 may, in response to a command received through the card connector 3130, store data in the card memory controller 3120 in synchronization with the clock signal CLK generated in the clock generator. Memory systems 3110 may store data transmitted from the host 3200.

The memory card 3100 may be realized by a compact flash card (CFC), a microdrive, a smart media card (SMC), a multimedia card (MMC), a secure digital card (SDC), a memory stick, a universal serial bus (USB) flash memory driver, etc.

Figure 16:
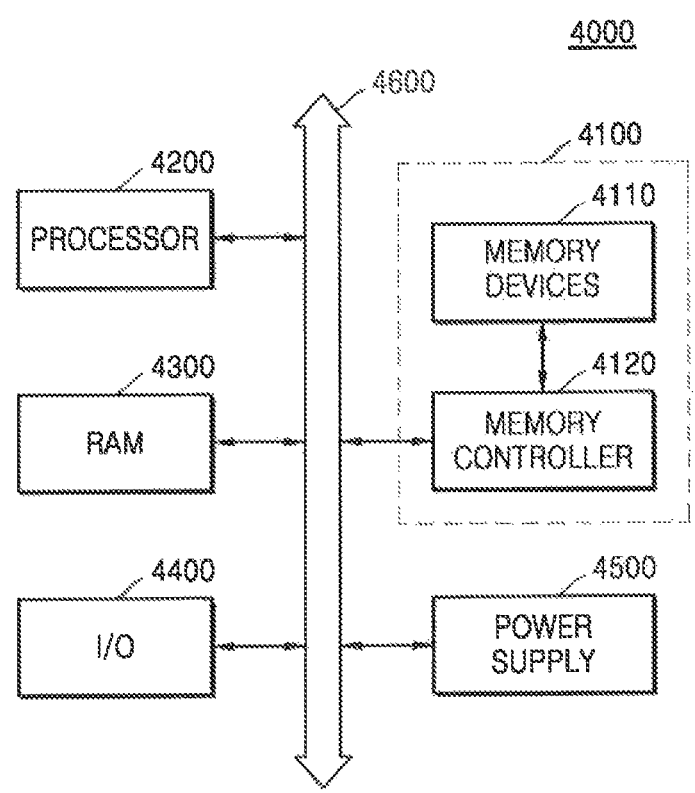
FIG. 16 is a block diagram illustrating a computing system including memory devices according to an exemplary embodiment of the present inventive concept.

FIG. 16 is a block diagram illustrating a computing system 4000 including memory devices 4110 according to an exemplary embodiment of the present inventive concept. Referring to FIG. 16, the computing system 4000 may include a system 4100, a processor 4200, a RAM 4300, an input/output (I/O) device 4400 and a power supply 4500. The computing system 4000 may communicate with a video card, a sound card, a memory card, a USB device, etc., or may include ports capable of communicating with other electronic devices. The computing system 4000 may be realized by a personal computer, or mobile electronic devices such as a notebook computer, a mobile phone, a personal digital assistant (PDA) and a camera.

The processor 4200 may perform particular calculations or tasks. According to an exemplary embodiment of the present inventive concept, the processor 4200 may be a micro-processor or a central processing unit (CPU). The processor 4200 may perform communication with the I/O device 4400 and the memory system 4100 through a bus 4600. The bus 4600 may be, for example, an address bus, a control bus or a data bus. The processor 4200 may be connected to an extended bus such as a peripheral component interconnect (PCI).

The memory system 4100 may include memory devices 4110 realized by using the exemplary embodiments illustrated in FIGS. 1 through 14. According to these embodiments, a structure of the memory system 4100 may be simplified by simplifying the channels connected between the memory controller 4120 and memory devices 4100. Further, since the memory controller 4120 may efficiently manage the memory devices 4110, the response time of the memory system 4100 to a request received from the processor 4220, etc. may be reduced.

The RAM 4300 may store data necessary for operations of the computing system 4000. For example, the RAM 4300 may be realized by using a dynamic random access memory (DRAM), a mobile DRAM, a static RAM (SRAM), a PRAM, a ferroelectric RAM (FRAM), a RRAM and/or an MRAM.

The I/O device 4400 may include input devices such as a keyboard, a keypad and a mouse, and output devices such as a printer and a display. The power supply 4500 may supply an operation voltage needed for operations of the computing system 4000.

Figure 17:
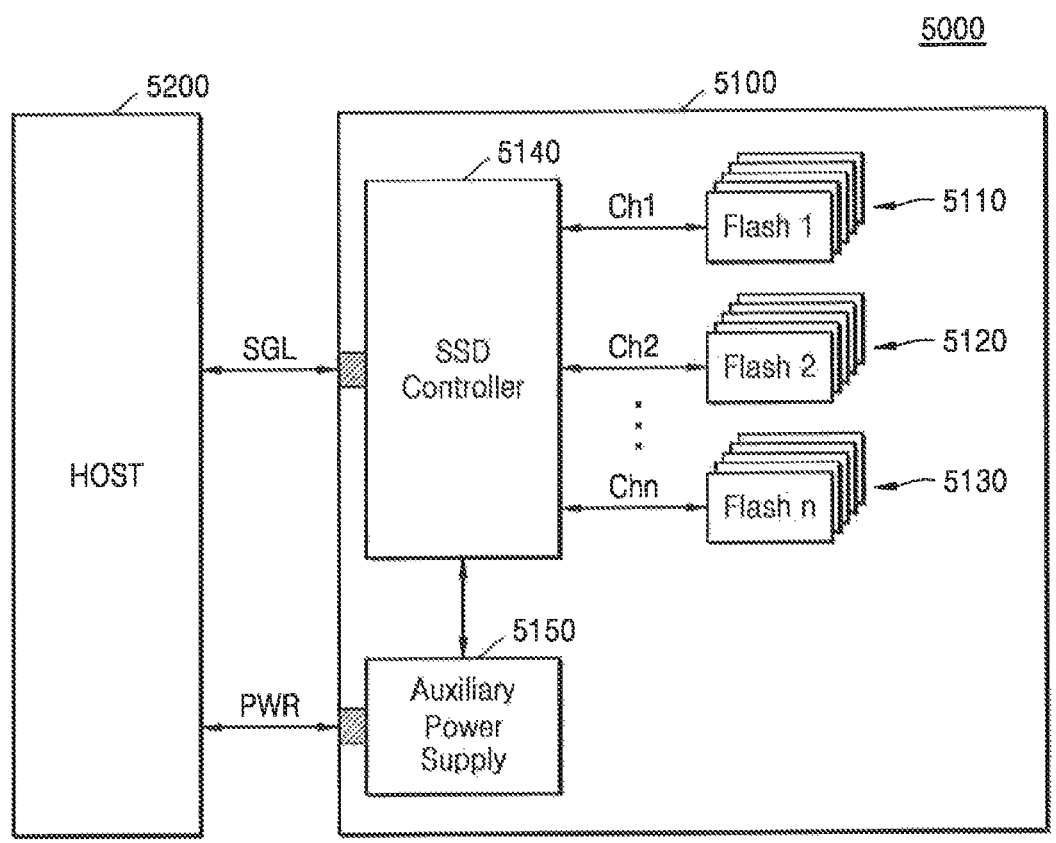
FIG. 17 is a block diagram illustrating a solid state drive (SSD) system including memory devices according to an exemplary embodiment of the present inventive concept.

FIG. 17 is a block diagram illustrating a solid state drive (SSD) system 5000 including memory devices according to an exemplary embodiment of the present inventive concept. Referring to FIG. 17, the SSD system 5000 may include a host 5200 and an SSD 5100. The SSD 5100 may exchange signals SGL with the host 5200 through a signal connector and receive a power supply PWR through a power connector. The SSD 5100 may include an SSD memory controller 5140, an auxiliary power supply 5150 and a plurality of memory device groups 5110, 5120, and 5130. The SSD controller 5140 may communicate with the plurality of memory device groups 5110, 5120, and 5130 through a plurality of channels Ch1 through Chn. Each of the plurality of memory device groups 5110, 5120, and 5130 may include a plurality of memory devices sharing one channel, and memory devices sharing one channel may perform operations as described above according to an exemplary embodiment of the present inventive concept and may be controlled by the SSD controller 5140.

While the inventive concept has been particularly shown and described with reference to exemplary embodiments thereof, it will be understood that various changes in form and details may be made therein without departing from the spirit and scope of the inventive concept as defined by the following claims.

What is claimed is:

1. A memory device, comprising:
    an input/output control unit for receiving input signals through an input/output bus; and
    a control logic unit for receiving control signals,
    wherein when the control signals satisfy first through fourth conditions, the control logic unit identifies a command, an address, data and a memory device identifier in the input signals, and latch the input signals,
    wherein the fourth condition is different from the first through third conditions.

2. The memory device of claim 1, further comprising a command register, an address register, a data register and an identifier register, wherein the control logic unit controls the latching of the input signals to the command register, the address register, the data register and the identifier register.

3. The memory device of claim 1, further comprising:
    an identifier storage; and
    an identifier comparator for comparing the latched memory device identifier with an identifier stored in the identifier storage,
    wherein the control logic unit puts the memory device in a standby mode or releases the memory device from the standby mode in response to an output signal of the identifier comparator.

4. The memory device of claim 3, wherein when the memory device is in the standby mode, the memory device does not latch the input signals when the control signals satisfy the first through third conditions.

5. The memory device of claim 3, wherein the memory device suspends a first mode at the time of entering the standby mode and resumes the first mode at the time of exiting the standby mode.

6. The memory device of claim 3, wherein the control logic unit stores values corresponding to the input signals in the identifier storage when the control signals satisfy a fifth condition different from the first through fourth conditions.

7. The memory device of claim 1, wherein the control signals comprise a chip enable, an address latch enable, a command latch enable and a write enable, and the fourth condition is a condition in which the write enable changes from an active state to an inactive state when the chip enable, the address latch enable and the command latch enable are each in an active state.

8. The memory device of claim 1, wherein the control signals comprise a chip enable, an address latch enable, a read enable and a write enable, and the fourth condition is a condition in which the write enable changes from an active state to an inactive state when the chip enable is in an active state and the address latch enable and the read enable are each in an inactive state.

9. The memory device of claim 1, wherein the control signals comprise a chip enable, an identifier enable and a write enable, and the fourth condition is a condition in which the write enable changes from an active state to an inactive state when the chip enable and the identifier enable are each in an active state.

10. The memory device of claim 1, wherein the control logic unit identifies input signals latched at a second time as identifiers of the memory device, when the control signals satisfy the fourth condition two or more consecutive times and input signals latched at a first time are equal to predetermined values.

11. A memory system, comprising:
    a first memory device and a second memory device sharing an input/output bus, wherein the first and second memory devices receive identical control signals, the first memory device stores a first identifier, the second memory device stores a second identifier and the first and second identifiers are different from each other,
    wherein each of the first and second memory devices receives input signals through the input/output bus, and when the control signals satisfy first through fourth conditions, each of the first and second memory devices identifies a command, an address, data and a memory device identifier in the input signals and latches the input signals,
    wherein the fourth condition is different from the first through third conditions.

12. The memory system of claim 11, wherein the first memory device is put in a standby mode or released from the standby mode in response to a comparison of the first identifier and an identifier of the first memory device, and the first memory device is put in a standby mode or released from the standby mode in response to a comparison of the second identifier and the identifier of the first memory device.

13. The memory system of claim 12, wherein when the first memory device is in the standby mode, the first memory device does not latch the input signals when the control signals satisfy the first through third conditions, and when the second memory device is in the standby mode, the second memory device does not latch the input signals when the control signals satisfy the first through third conditions.

14. The memory system of claim 12, wherein each of the first and second memory devices suspends a first mode at the time of entering the standby mode from the first mode, and resumes the first mode at the time of exiting the standby mode.

15. The memory system of claim 11, further comprising a memory controller which is connected to the input/output bus, wherein the memory controller generates the control signals and performs first and second operations respectively accessing the first and second memory devices, wherein the memory controller suspends the first operation, and starts to perform the second operation by transmitting the second identifier via the input/output bus and transmitting control signals satisfying the fourth condition, and resumes the first operation by transmitting the first identifier via the input/output bus after completion of the second operation and transmitting control signals satisfying the fourth condition.

16. A memory system, comprising:
a controller configured to output control signals and input signals; and
a first memory device configured to receive the control signals and the input signals from the controller and latch a first device identifier at a condition different from conditions of control signals for latching a command, an address and data.

17. The memory system of claim 16, wherein the control signals are provided to the first memory device via signal lines and the input signals are provided to the first memory device via a data bus.

18. The memory system of claim 16, further comprising a second memory device, wherein the first memory device and the second memory device share a channel.

19. The memory system of claim 18, wherein when the first memory device receives a second device identifier, operations of the first memory device are stopped, and when the first memory device again receives the first device identifier, the operations of the first memory device pick up where they left off.

20. The memory system of claim 16, wherein the first memory device includes vertical NAND flash memory cells.

* * * * *